US012380862B2

(12) United States Patent
Jung

(10) Patent No.: US 12,380,862 B2
(45) Date of Patent: Aug. 5, 2025

(54) METHOD OF COMPENSATING FOR AN OUTPUT OF A DATA DRIVER

(71) Applicant: Samsung Display Co., LTD., Yongin-si (KR)

(72) Inventor: Hayong Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 5 days.

(21) Appl. No.: 18/501,234

(22) Filed: Nov. 3, 2023

(65) Prior Publication Data

US 2024/0169932 A1 May 23, 2024

(30) Foreign Application Priority Data

Nov. 22, 2022 (KR) ........................ 10-2022-0157499

(51) Int. Cl.
*G09G 3/3291* (2016.01)
*G09G 5/02* (2006.01)

(52) U.S. Cl.
CPC ........... *G09G 3/3291* (2013.01); *G09G 5/028* (2013.01); *G09G 2320/0666* (2013.01)

(58) Field of Classification Search
CPC .............................................. G09G 2320/0666
See application file for complete search history.

(56) References Cited

U.S. PATENT DOCUMENTS

| | | | | |
|---|---|---|---|---|
| 9,926,896 | B2 | 3/2018 | Nakashima et al. | |
| 9,927,865 | B2 | 3/2018 | Heo et al. | |
| 10,430,918 | B2 | 10/2019 | Kim et al. | |
| 10,467,951 | B2 | 11/2019 | Bae et al. | |
| 2010/0225634 | A1* | 9/2010 | Levey .................. | G09G 3/3208 345/212 |
| 2015/0222252 | A1* | 8/2015 | Kim .................... | H03F 3/45771 327/307 |

FOREIGN PATENT DOCUMENTS

| | | |
|---|---|---|
| KR | 10-2016-0043326 | 4/2016 |
| KR | 10-2018-0011557 | 2/2018 |
| KR | 10-2075920 | 2/2020 |

* cited by examiner

*Primary Examiner* — Gustavo Polo
(74) *Attorney, Agent, or Firm* — KILE PARK REED & HOUTTEMAN PLLC

(57) ABSTRACT

A method of compensating for an output of a data driver of a display device includes measuring a first output value of a sensing circuit that senses pixels by applying an external voltage to the sensing circuit, measuring second output values of the sensing circuit by applying output voltages within an output range of the data driver to the sensing circuit through output amplifiers of the data driver, generating a compensation look-up table based on the first output value and the second output values, and compensating for the output voltages of the data driver based on the compensation look-up table.

20 Claims, 39 Drawing Sheets

METHOD OF COMPENSATING FOR AN OUTPUT OF A DATA DRIVER

CROSS-REFERENCE TO RELATED APPLICATION(S)

This application claims priority to and benefits of Korean Patent Application No. 10-2022-0157499 under 35 USC § 119, filed on Nov. 22, 2022 in the Korean Intellectual Property Office (KIPO), the entire contents of which are incorporated herein by reference.

BACKGROUND

1. Technical Field

Embodiments of the disclosure relate to a method of compensating for an output of a data driver included in a display device.

2. Description of the Related Art

In general, a display device may include a display panel, a gate driver, a data driver, and a timing controller. The display panel may include gate lines, data lines, and pixels electrically connected to the gate lines and the data lines. The gate driver may provide gate signals to the gate lines, the data driver may provide data voltages to the data lines, and the timing controller may control the gate driver and the data driver.

The display device may have a difference in electrical characteristics, such as a threshold voltage and mobility of a driving transistor and a capacitance of a light emitting element, for each pixel due to a process variation or the like. Therefore, in order to improve display quality, the display device may sense the difference in the electrical characteristics of the pixels and compensate for the difference in the electrical characteristics.

However, a voltage input to output amplifiers of the data driver to perform a sensing operation may be different from a voltage input to the output amplifiers of the data driver to display an image. The output amplifiers that provide the data voltages may have mutually different output deviations among the output amplifiers depending on the input voltage. As a result, since the output deviations are different from each other, compensation may not be accurately performed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An aspect of the disclosure is to provide a method of compensating for an output of a data driver, capable of compensating for output deviations of the data driver.

However, aspects of the disclosure are not limited thereto. Aspects of the disclosure may be extended without departing from the spirit and the scope of the disclosure.

According to an embodiment, a method of compensating for an output of a data driver of a display device may include measuring a first output value of a sensing circuit that senses pixels by applying an external voltage to the sensing circuit, measuring second output values of the sensing circuit by applying output voltages within an output range of the data driver to the sensing circuit through output amplifiers of the data driver, generating a compensation look-up table based on the first output value and the second output values, and compensating for the output voltages of the data driver based on the compensation look-up table.

In an embodiment, the compensation look-up table may be generated based on differences between the first output value and the second output values.

In an embodiment, the data driver may output gray level voltages as the output voltages.

In an embodiment, the measuring of the second output values may include measuring the second output values for a first color by applying the gray level voltages for the first color to the sensing circuit through the output amplifiers for the first color, measuring the second output values for a second color by applying the gray level voltages for the second color to the sensing circuit through the output amplifiers for the second color, and measuring the second output values for a third color by applying the gray level voltages for the third color to the sensing circuit through the output amplifiers for the third color.

In an embodiment, a number of the output amplifiers the first color may be equal to a horizontal resolution of a display panel, a number of the output amplifiers for the second color may be equal to the horizontal resolution of the display panel, and a number of the output amplifiers for the third color may be equal to the horizontal resolution of the display panel. A number of the second output values for the first color may be equal to a number of gray levels multiplied by the horizontal resolution, a number of the second output values for the second color may be equal to the number of gray levels multiplied by the horizontal resolution, and a number of the second output values for the third color may be equal to the number of the gray levels multiplied by the horizontal resolution.

In an embodiment, the compensation look-up table may include compensation values. A number of the compensation values for the first color may be equal to the number of the gray levels multiplied by the horizontal resolution multiplied by a vertical resolution of the display panel, a number of the compensation values for the second color may be equal to the number of the gray levels multiplied by the horizontal resolution multiplied by the vertical resolution of the display panel, and a number of the compensation values for the third color may be equal to the number of the gray levels multiplied by the horizontal resolution multiplied by the vertical resolution of the display panel.

In an embodiment, the measuring of the second output values may include repeatedly applying the output voltages, which are equal to each other, to the sensing circuit through the output amplifiers and calculating average values of the second output values for the output voltages, which are equal to each other. The compensation look-up table may be generated based on the average values.

In an embodiment, the compensation look-up table may include compensation values for compensating for deviations of the output amplifiers for differences between the first output value and the second output values.

In an embodiment, the output voltages may be compensated for by adding the compensation values to the output voltages.

In an embodiment, the data driver may output gray level voltages as the output voltages. The compensation look-up table may include compensation values. Further, the compensation values for the gray level voltages corresponding to a reference gray level or less may be about 0.

In an embodiment, the data driver may output gray level voltages as the output voltages. The compensation look-up table may include compensation values. Further, the compensation values for the gray level voltages corresponding to a reference gray level or more may be about 0.

In an embodiment, the data driver may include a DC-DC converter that determines the output voltages of the data driver based on a voltage control signal.

In an embodiment, the sensing circuit may include a sensing line initialization circuit that initializes a sensing line, a line selection switch that electrically connects the sensing line to a sensing channel, and the sensing channel that samples a sensing voltage of the sensing line.

In an embodiment, the second output values may be measured by applying the output voltages to the sensing channel.

In an embodiment, the sensing circuit may further include an analog-to-digital converter, and a switch matrix that electrically connects the sensing channel to the analog-to-digital converter.

According to an embodiment, a method of compensating for an output of a data driver of a display device may include measuring a first output value of a sensing circuit that senses pixels by applying an external voltage to the sensing circuit, measuring second output values of the sensing circuit by applying output voltages within an output range of the data driver to the sensing circuit through a first portion of output amplifiers of the data driver, measuring the second output values of the sensing circuit by applying the output voltages to the sensing circuit through a second portion of the output amplifiers, generating a compensation look-up table based on the first output value and the second output values, and compensating for the output voltages of the data driver based on the compensation look-up table.

In an embodiment, the compensation look-up table may be generated based on differences between the first output value and the second output values.

In an embodiment, the sensing circuit may include a sensing line initialization circuit that simultaneously initializes a first sensing line and a second sensing line, a first line selection switch that electrically connects the first sensing line to a sensing channel, a second line selection switch that electrically connects the second sensing line to the sensing channel, and the sensing channel that samples a first sensing voltage of the first sensing line and that samples a second sensing voltage of the second sensing line.

In an embodiment, the second output values may be measured by applying the output voltages to the sensing channel.

In an embodiment, the sensing circuit may further include an analog-to-digital converter, and a switch matrix that electrically connects the sensing channel to the analog-to-digital converter.

A method of compensating for an output of a data driver according to embodiments may include measuring a first output value of a sensing circuit that senses pixels by applying an external voltage to the sensing circuit, measuring second output values of the sensing circuit by applying output voltages within an output range of the data driver to the sensing circuit through output amplifiers of the data driver, generating a compensation look-up table based on the first output value and the second output values, and compensating for the output voltages of the data driver based on the compensation look-up table, so that the output deviations of the data driver can be compensated for. Accordingly, the method of compensating for the output of the data driver can prevent a vertical line from being visually recognized on a display panel.

However, the effects of the disclosure are not limited thereto. Effects of the disclosure may be extended without departing from the spirit and the scope of the disclosure.

DETAILED DESCRIPTION OF THE EMBODIMENTS

Figure 1:
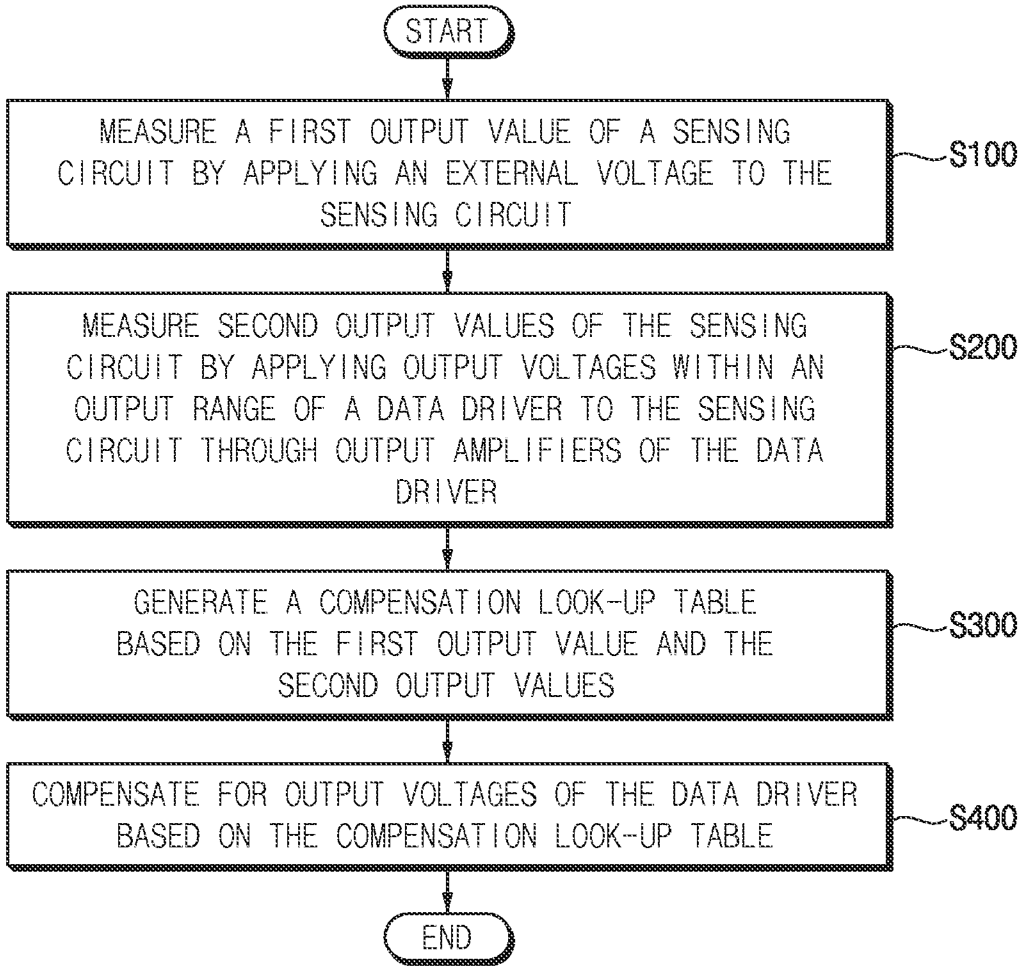
FIG. 1 is a flowchart showing a method of compensating for an output of a data driver according to an embodiment of the disclosure.

Hereinafter, embodiments of the disclosure will be explained in detail with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart showing a method of compensating for an output of a data driver according to an embodiment of the disclosure.

Referring to FIG. 1, a method of compensating for an output of a data driver of FIG. 1 may include measuring a first output value of a sensing circuit that senses pixels by applying an external voltage to the sensing circuit (S100), measuring second output values of the sensing circuit by applying output voltages within an output range of the data driver to the sensing circuit through output amplifiers of the data driver (S200), generating a compensation look-up table based on the first output value and the second output values (S300), and compensating for the output voltages of the data driver based on the compensation look-up table (S400).

Hereinafter, the above configuration will be described in detail.

Figure 2:
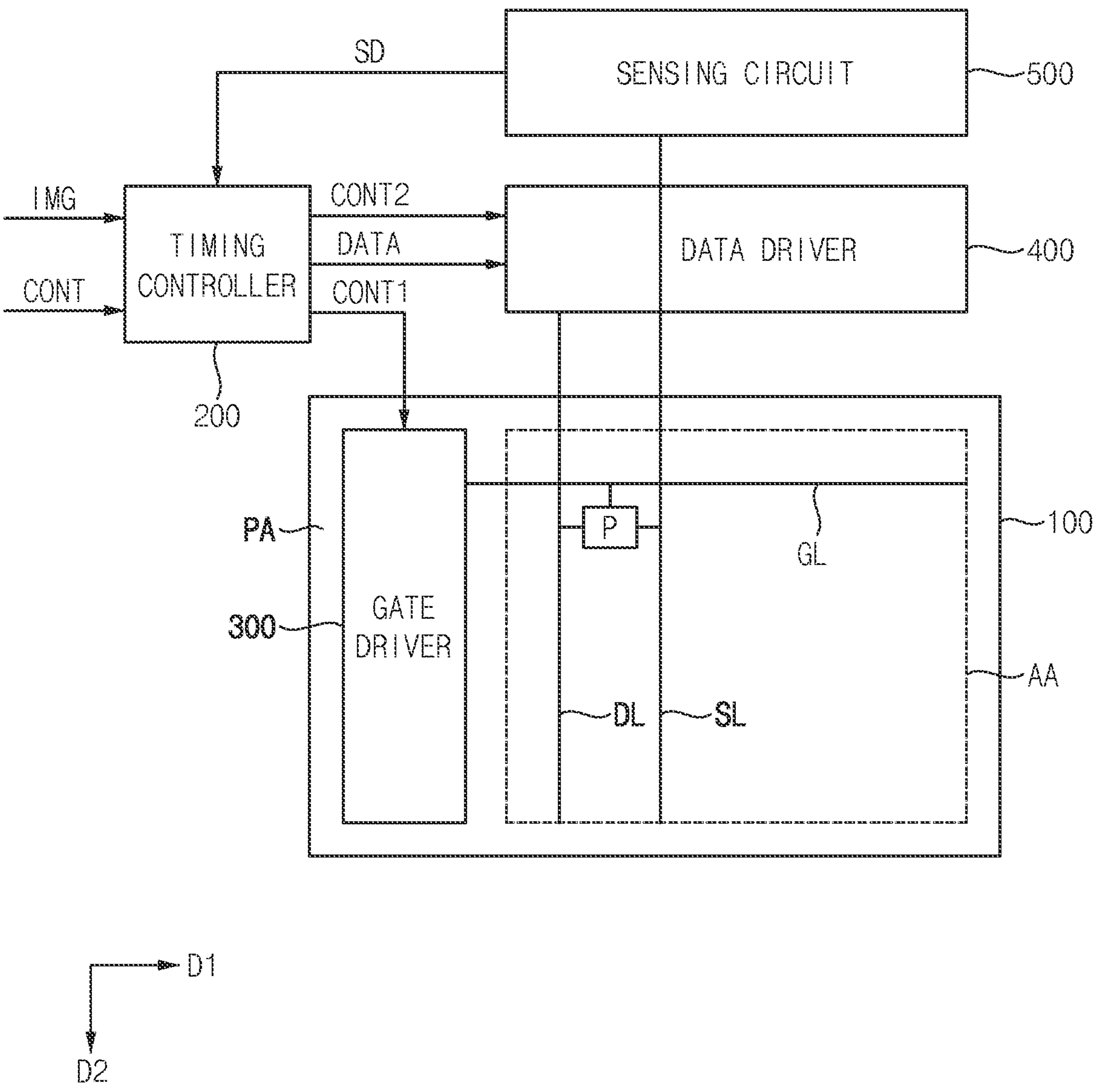
FIG. 2 is a schematic block diagram showing an example of a display device according to the method of compensating of FIG. 1.

FIG. 2 is a schematic block diagram showing an example of a display device according to the method of compensating of FIG. 1.

Referring to FIG. 2, a display device may include a display panel 100, a timing controller 200, a gate driver 300, a data driver 400, and a sensing circuit 500. According to an embodiment, the timing controller 200 and the data driver 400 may be integrated on a single chip. According to an embodiment, the data driver 400 and the sensing circuit 500 may be integrated on a single chip.

The display panel 100 may include a display part AA that displays an image, and a peripheral part PA that is adjacent to the display part AA. According to an embodiment, the gate driver 300 may be mounted on the peripheral part PA.

The display panel 100 may include gate lines GL, data lines DL, sensing lines SL, and pixels P electrically connected to the gate lines GL, the data lines DL, and the sensing lines SL. The gate lines GL may extend in a first direction D1, and the data lines DL and the sensing lines SL may extend in a second direction D2 intersecting the first direction D1.

The timing controller 200 may receive input image data IMG and an input control signal CONT from a host processor (e.g., a graphic processing unit (GPU), etc.). For example, the input image data IMG may include red image data, green image data, and blue image data. According to an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate the gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages (i.e., output voltages of the data driver 400) obtained by converting the data signal DATA into an analog voltage. The data driver 400 may output the data voltages (i.e., the output voltages of the data driver 400) to the data lines DL.

The sensing circuit 500 may sense electrical characteristics of the pixels P through the sensing lines SL to generate sensing data SD, and provide the sensing data SD to the timing controller 200. The timing controller 200 may compensate for deviations in the electrical characteristics among the pixels P based on the sensing data SD. In other words, the timing controller 200 may compensate for the input image data IMG based on the sensing data SD.

Figure 3:
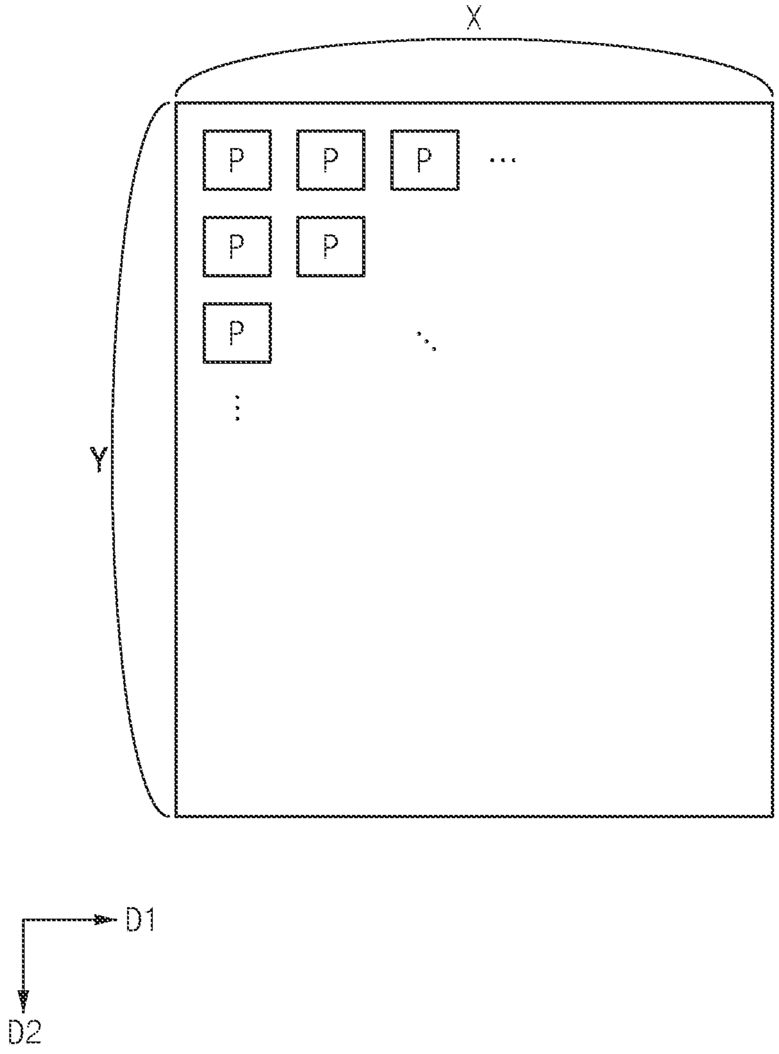
FIG. 3 is a schematic view showing an example of a display panel according to the method of compensating of FIG. 1.
Figure 4:
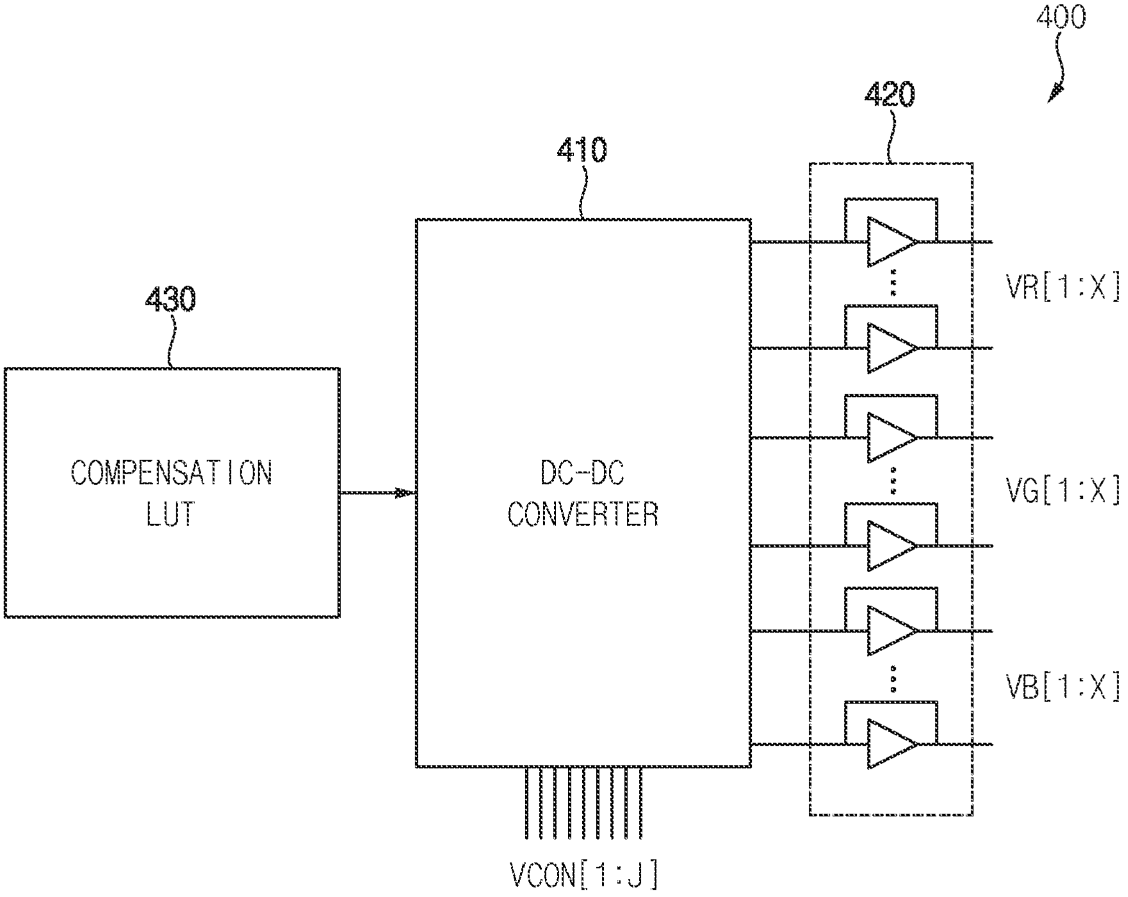
FIG. 4 is a schematic view showing an example of the data driver according to the method of compensating of FIG. 1.

FIG. 3 is a schematic view showing an example of a display panel 100 according to the method of compensating of FIG. 1, and FIG. 4 is a schematic view showing an example of the data driver 400 according to the method of compensating FIG. 1.

Referring to FIGS. 2 to 4, the display panel 100 may have X×Y resolution (where X and Y are positive integers). In this case, X may be a horizontal resolution, and Y may be a vertical resolution. In other words, the display panel 100 may have X pixel columns extending in the second direction D2 and Y pixel rows extending in the first direction D1.

The data driver 400 may include a DC-DC converter 410 that determines the output voltages of the data driver 400 based on a voltage control signal VCON, output amplifiers 420 that output the output voltages of the data driver 400, and a compensation look-up table 430 including compensation values CV for compensating for deviations of the output amplifiers 420 of the data driver 400.

The data driver 400 may output gray level voltages VR, VG, and VB as the output voltages. For example, the timing controller 200 may output the second control signal CONT2, which includes the voltage control signal VCON for gray levels of the input image data IMG, to the data driver 400.

The voltage control signal VCON may include J types of signals (where J is a positive integer). For example, in case that the display device displays 256 gray levels from 0 to 255, J may be 256. In other words, the voltage control signal VCON may include 256 types of signals. For example, an output range of the data driver 400 may be between a gray level voltage corresponding to a 0-gray level and a gray level voltage corresponding to a 255-gray level.

The output voltages may be compensated for by adding the compensation values CV to the output voltages. For example, the DC-DC converter 410 may add the compensation values CV to the gray level voltages VR, VG, and VB determined according to the voltage control signal VCON, so that output deviations of the data driver 400 may be compensated for. The compensation values CV will be described in detail below.

The output amplifiers 420 may output the gray level voltages VR, VG, and VB to the data lines DL. The number of the output amplifiers 420 for each of colors may be equal to the horizontal resolution of the display panel 100.

For example, in case that the horizontal resolution of the display panel is X, the output amplifiers 420 may output gray level voltages VR for a first color to X data lines DL connected to sub-pixels, which display the first color and included in the pixels P. For example, in case that the horizontal resolution of the display panel is X, the output amplifiers 420 may output gray level voltages VG for a second color to X data lines DL connected to sub-pixels, which display the second color and included in the pixels P. For example, in case that the horizontal resolution of the display panel is X, the output amplifiers 420 may output gray level voltages VB for a third color to X data lines DL connected to sub-pixels, which display the third color and included in the pixels P.

Although the output amplifiers 420 have been illustrated in FIG. 4 as being arranged in an order of the output amplifiers 420 that outputs the gray level voltages VR for the first color, the output amplifiers 420 that outputs the gray level voltages VG for the second color, and the output amplifiers 420 that outputs the gray level voltages VB for the third color, the disclosure is not limited to the order in which the output amplifiers 420 are arranged.

Figure 5:
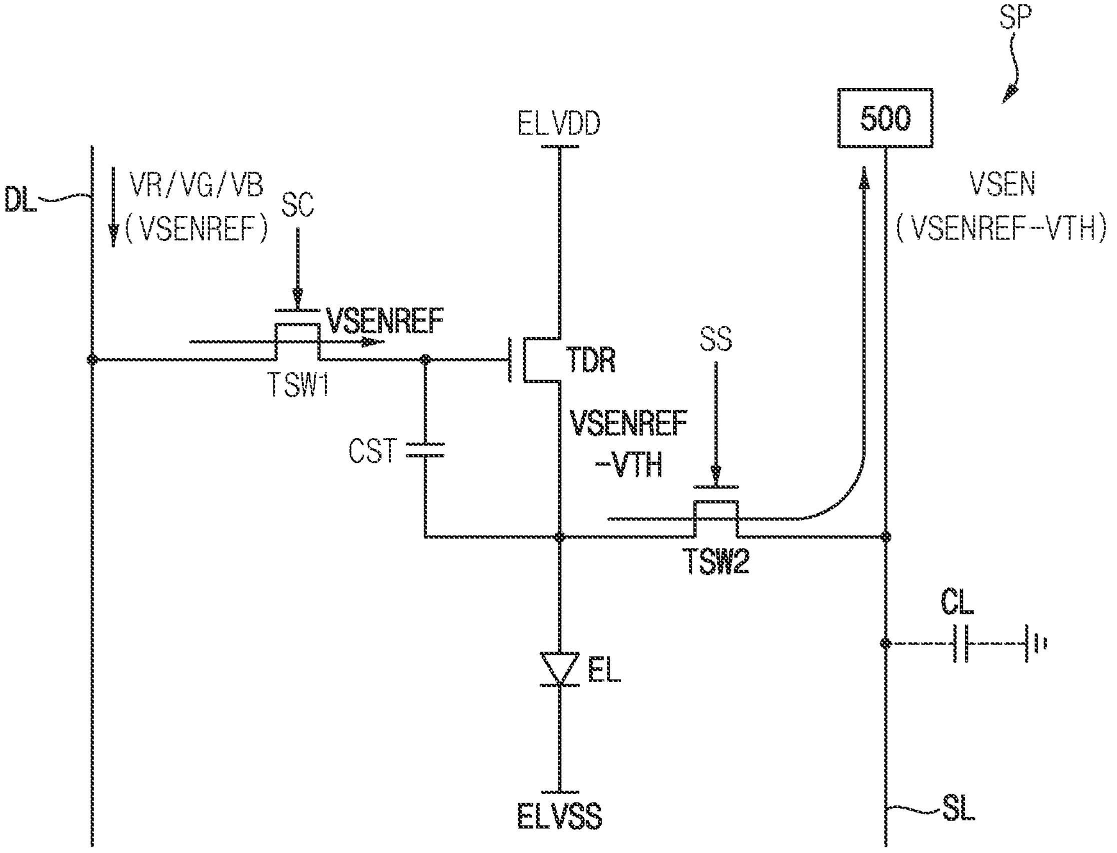
FIG. 5 is a schematic diagram of a circuit showing an example of a sub-pixel according to the method of compensating of FIG. 1.
Figure 6:
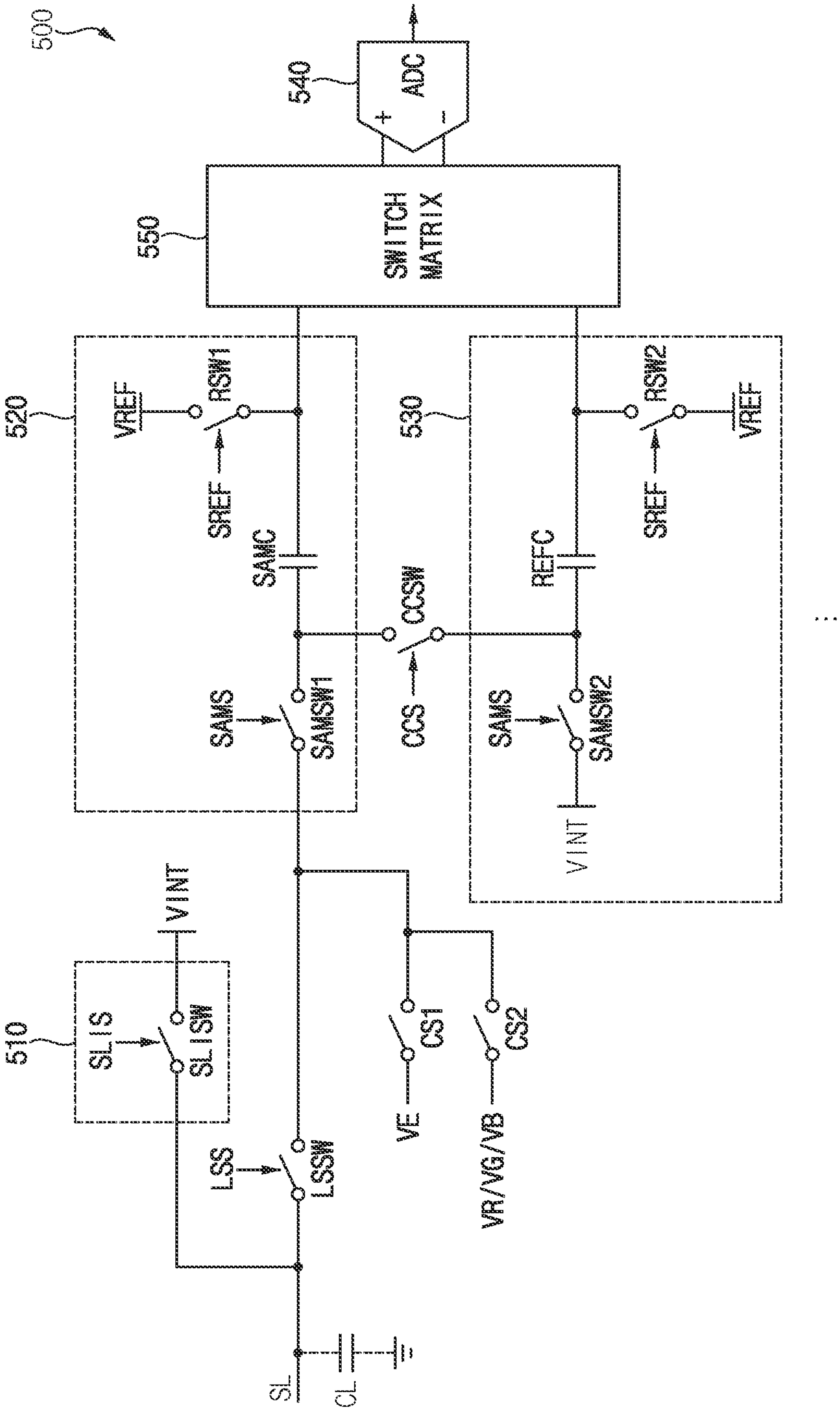
FIG. 6 is a schematic diagram of a circuit showing an example of a sensing circuit according to the method of compensating of FIG. 1.

FIG. 5 is a schematic diagram of a circuit showing an example of a sub-pixel SP according to the method of compensating of FIG. 1, FIG. 6 is a schematic diagram of a circuit showing an example of a sensing circuit 500 according to the method of compensating of FIG. 1, and FIGS. 7 to 10 are schematic diagrams of a circuit showing an example in which the sensing circuit 500 according to the method of compensating of FIG. 1 generates sensing data SD. Since a first compensation switch CS1 and a second compensation switch CS2 are structures that generate the compensation look-up table 430, the first compensation switch CS1 and the second compensation switch CS2 will be described below with reference to FIGS. 11 to 16.

Referring to FIGS. 2 and 5, each of the pixels P may include a sub-pixel SP that displays a first color, a sub-pixel SP that displays a second color, and a sub-pixel SP that displays a third color. For example, the first color may be a red color, the second color may be a green color, and the third color may be a blue color.

The sub-pixel SP may include a first switching transistor TSW1 that transmits the gray level voltages VR, VG, and VB (or a sensing reference voltage VSENREF) of the data line DL to a storage capacitor CST in response to a scan signal SC, the storage capacitor CST that stores the gray level voltages VR, VG, and VB transmitted by the first switching transistor TSW1, a driving transistor TDR that generates a driving current based on the gray level voltages VR, VG, and VB stored in the storage capacitor CST, a light emitting element EL that emits a light based on the driving current flowing from a first power supply voltage ELVDD to a second power supply voltage ELVSS, and a second switching transistor TSW2 that connects a terminal (e.g., a source) of the driving transistor TDR to the sensing line SL in response to a sensing signal SS. The sensing line SL may have a parasitic capacitor CL.

In a sensing period, the gate driver 300 may provide the scan signal SC and the sensing signal SS to each of sub-pixels SP of a selected pixel row, and the data driver 400 may provide the sensing reference voltage VSENREF to each of the sub-pixels SP of the selected pixel row. The first switching transistor TSW1 may transmit the sensing reference voltage VSENREF to a gate of the driving transistor TDR in response to the scan signal SC. In case that the sensing reference voltage VSENREF is applied to the gate of the driving transistor TDR, a voltage of the terminal (e.g., the source) of the driving transistor TDR may be saturated with a voltage VSENREF-VREF obtained by subtracting a threshold voltage VTH of the driving transistor TDR from the sensing reference voltage VSENREF. The second switching transistor TSW2 may transmit the voltage VSENREF-VREF of the terminal of the driving transistor TDR to the sensing line SL in response to the sensing signal SS, and the sensing circuit 500 may sense the voltage VSENREF-VREF, which is obtained by subtracting the threshold voltage VTH of the driving transistor TDR from the sensing reference voltage VSENREF, as a sensing voltage VSEN of the sensing line SL.

Although one example of the sub-pixel SP has been shown in FIG. 5, the sub-pixels SP according to the method of compensating of FIG. 1 are not limited to the example of FIG. 5. The display panel 100 may be any display panel without being limited to the light emitting display panel.

Referring to FIGS. 6 to 10, the sensing circuit 500 may include a sensing line initialization circuit 510 that initializes the sensing line SL, a line selection switch LSSW that connects the sensing line SL to a sensing channel 520, and the sensing channel 520 that samples the sensing voltage VSEN of the sensing line SL. The sensing circuit 500 may include a reference channel 530 and a channel connection switch CCSW. The sensing circuit 500 may include an analog-to-digital converter 540 and a switch matrix 550 that connects the sensing channel 520 to the analog-to-digital converter 540.

The sensing circuit 500 may include sensing channels 520 connected to the sensing lines SL, respectively. The switch matrix 550 may select and connect at least one of the sensing channels 520 to the analog-to-digital converter 540.

The sensing circuit 500 may include reference channels 530 connected to the sensing channels 520, respectively. The switch matrix 550 may connect at least one of the reference channels 530 to the analog-to-digital converter 540.

The sensing line initialization circuit 510 may include a sensing line initialization switch SLISW that applies an initialization voltage VINT to the sensing line SL in response to a sensing line initialization signal SLIS.

The sensing channel 520 may include a sampling capacitor SAMC having a first electrode and a second electrode, a first sampling switch SAMSW1 that connects the line selection switch LSSW to the first electrode of the sampling capacitor SAMC in response to a sampling signal SAMS, and a first reference switch RSW1 that applies a reference voltage VREF to the second electrode of the sampling capacitor SAMC in response to a reference signal SREF.

The reference channel 530 may include a reference capacitor REFC having a first electrode and a second electrode, a second sampling switch SAMSW2 that applies the initialization voltage VINT to the first electrode of the reference capacitor REFC in response to the sampling signal SAMS, and a second reference switch RSW2 that applies the reference voltage VREF to the second electrode of the reference capacitor REFC in response to the reference signal SREF.

The channel connection switch CCSW may connect the first electrode of the sampling capacitor SAMC and the first electrode of the reference capacitor REFC to each other in response to a channel connection signal CCS.

Figure 7:
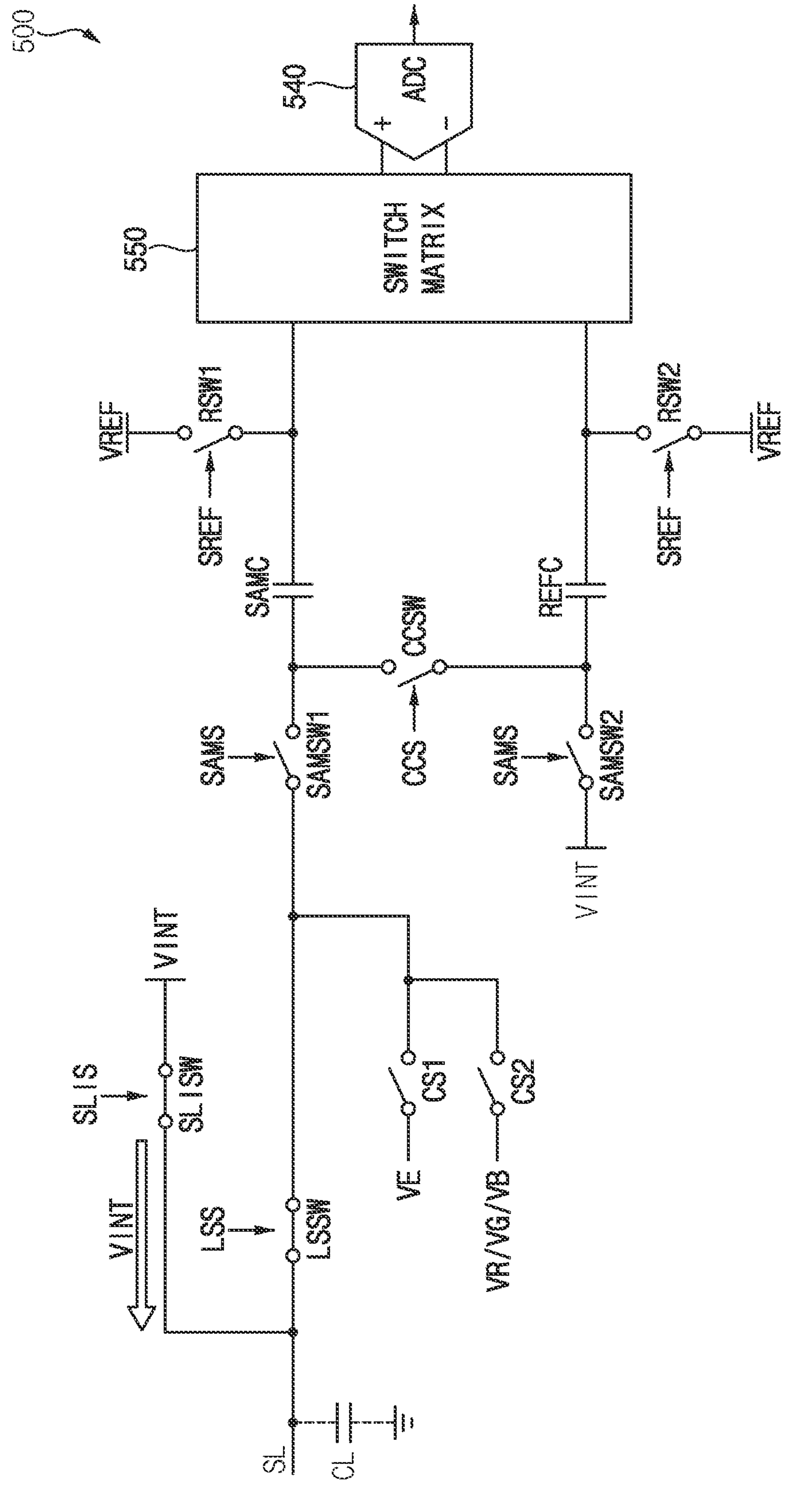
FIGS. 7 to 10 are schematic diagrams of a circuit showing an example in which the sensing circuit according to the method of compensating of FIG. 1 generates sensing data.

In a sensing line initialization period, as shown in FIG. 7, the sensing line initialization circuit 510 may initialize the sensing line SL. For example, in the sensing line initialization period, the sensing line initialization signal SLIS may have an activation level, the sensing line initialization switch SLISW may apply the initialization voltage VINT to the sensing line SL in response to the sensing line initialization signal SLIS having the activation level, and the sensing line SL may be initialized based on the initialization voltage VINT.

Figure 8:
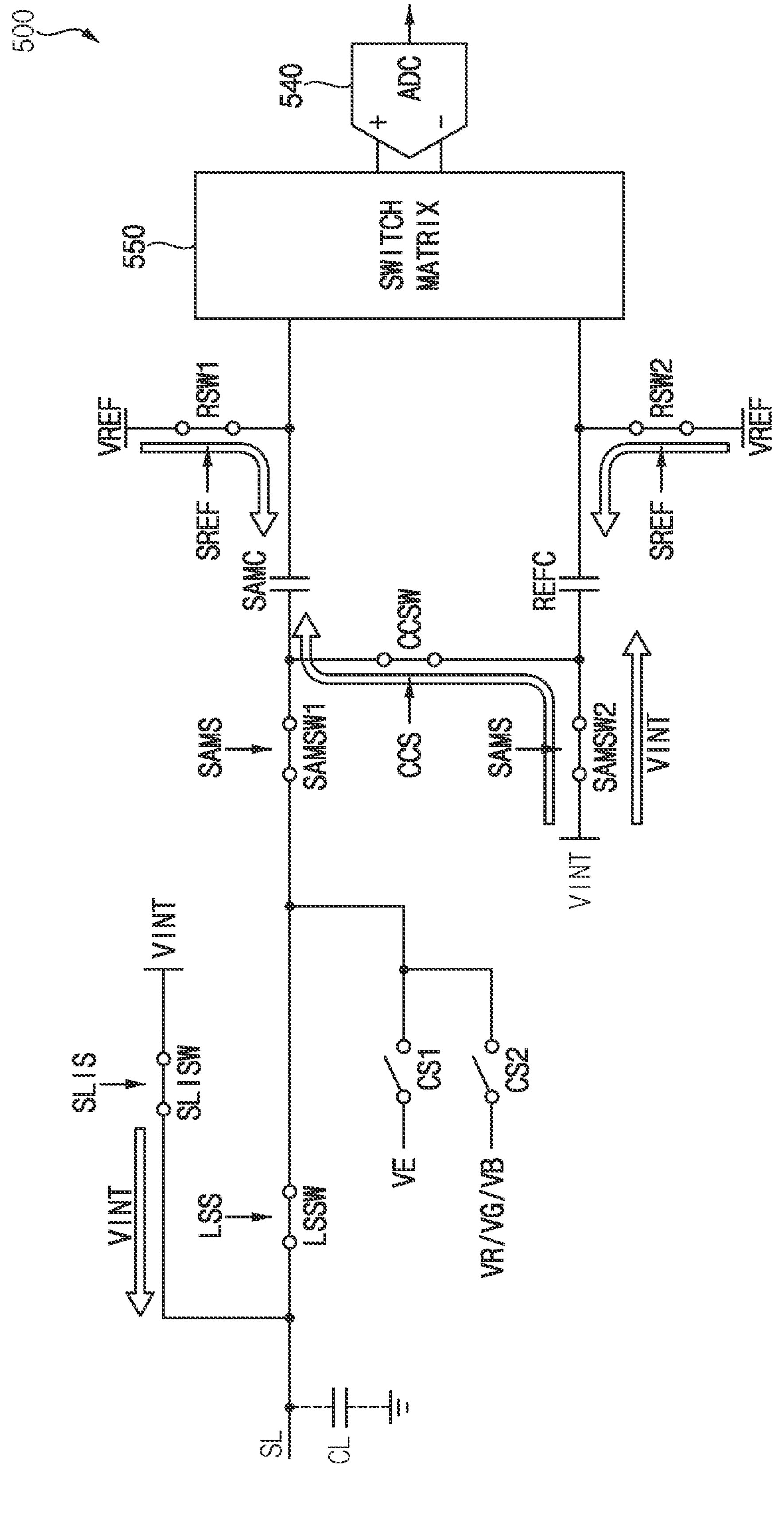

In a capacitor initialization period, as shown in FIG. 8, the sampling capacitor SAMC and the reference capacitor REFC may be initialized. According to an embodiment, the capacitor initialization period may overlap a portion of the sensing line initialization period, for example, an end portion of the sensing line initialization period. For example, in the capacitor initialization period, the sampling signal SAMS, the reference signal SREF, and the channel connection signal CCS may have activation levels. The second sampling switch SAMSW2 may be turned on in response to the sampling signal SAMS having the activation level, and the channel connection switch CCSW may be turned on in response to the channel connection signal CCS having the activation level. Therefore, the initialization voltage VINT may be applied to the first electrode of the reference capacitor REFC through the second sampling switch SAMSW2, and may be applied to the first electrode of the sampling capacitor SAMC through the second sampling switch SAMSW2 and the channel connection switch CCSW. The first reference switch RSW1 and the second reference switch RSW2 may be turned on in response to the reference signal SREF having the activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2. Therefore, the sampling capacitor SAMC and the reference capacitor REFC may be initialized or discharged based on the initialization voltage VINT and the reference voltage VREF. According to an embodiment, the reference voltage VREF may have, but is not limited to, the same voltage level as the initialization voltage VINT. According to an embodiment, in the capacitor initialization period, the sensing line initialization signal SLIS and a line selection signal LSS may also have activation levels, the initialization voltage VINT may be further applied to the first electrode of the sampling capacitor SAMC through the sensing line initialization switch SLISW, the line selection switch LSSW, and the first sampling switch SAMSW1, and the initialization voltage VINT may be further applied to the first electrode of the reference capacitor REFC through the sensing line initialization switch SLISW, the line selection switch LSSW, the first sampling switch SAMSW1, and the channel connection switch CCSW.

Figure 9:
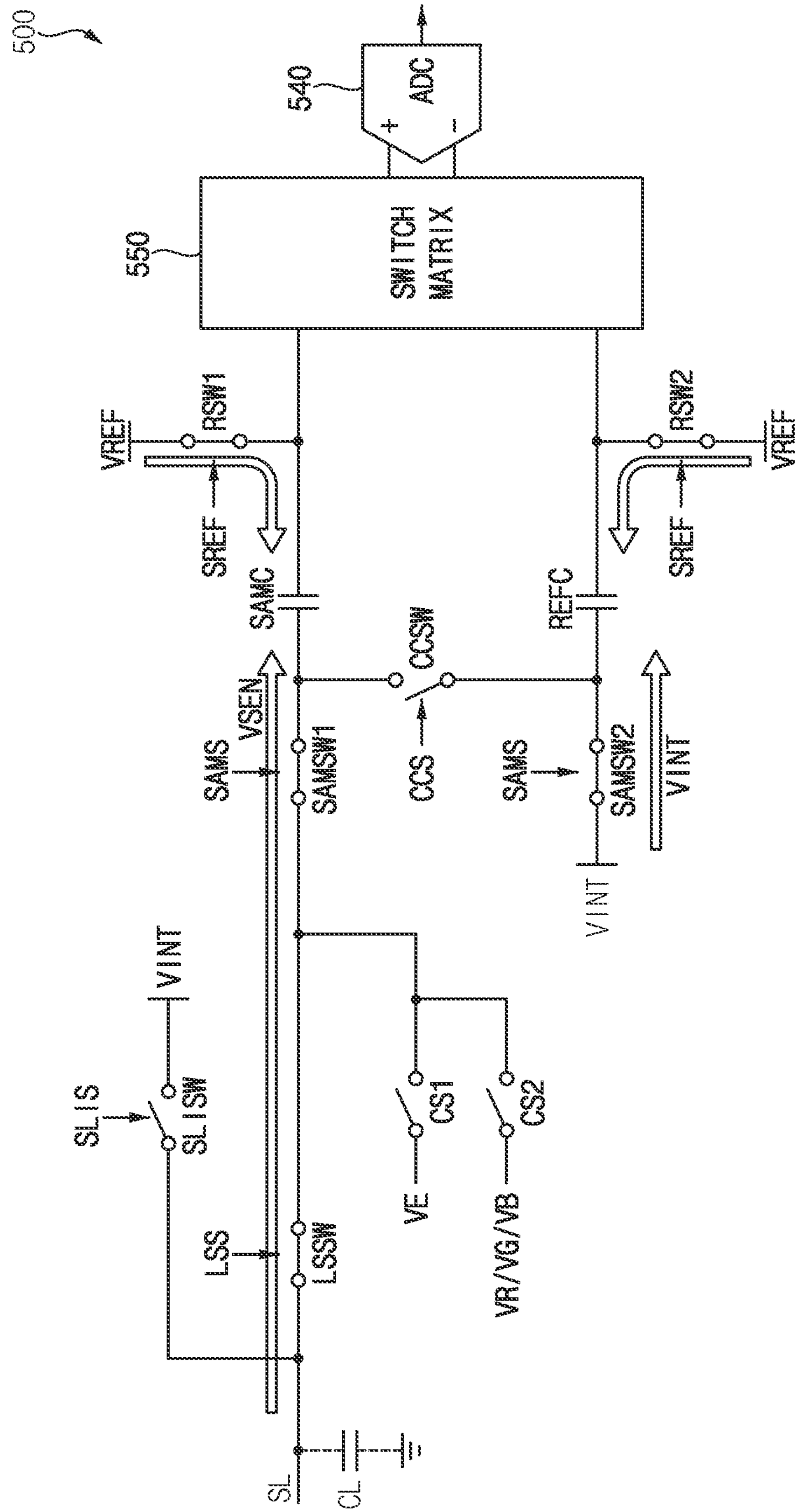

In a sampling period, as shown in FIG. 9, a voltage of the sensing line SL may be saturated with the sensing voltage VSEN, and the sensing channel 520 may sample the sensing voltage VSEN of the sensing line SL. For example, in the sampling period, the line selection signal LSS, the sampling signal SAMS, and the reference signal SREF may have activation levels. The line selection switch LSSW may be turned on in response to the line selection signal LSS having the activation level, and the first sampling switch SAMSW1 and the second sampling switch SAMSW2 may be turned on in response to the sampling signal SAMS having the activation level. Therefore, the sensing voltage VSEN of the sensing line SL may be applied to the first electrode of the sampling capacitor SAMC through the line selection switch LSSW and the first sampling switch SAMSW1, and the initialization voltage VINT may be applied to the first electrode of the reference capacitor REFC through the second sampling switch SAMSW2. The first reference switch RSW1 and the second reference switch RSW2 may be turned on in response to the reference signal SREF having the activation level. Therefore, the reference voltage VREF may be applied to the second electrode of the sampling capacitor SAMC through the first reference switch RSW1, and may be applied to the second electrode of the reference capacitor REFC through the second reference switch RSW2.

Figure 10:
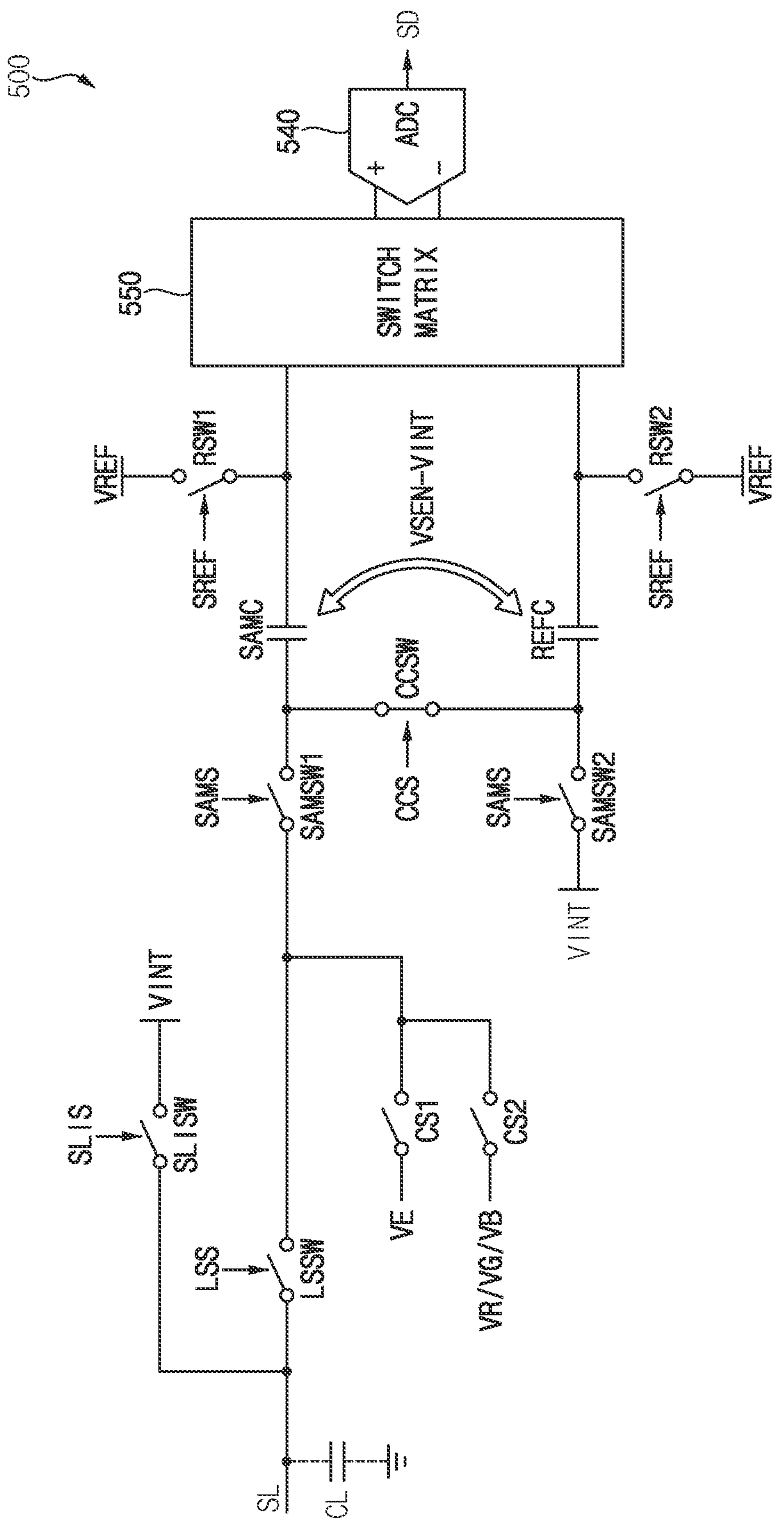

In an analog-to-digital conversion period, as shown in FIG. 10, the switch matrix 550 and the analog-to-digital converter 540 may sequentially convert the sensing voltages VSEN of the sensing lines SL sampled by the sensing channels 520 into the sensing data SD. For example, the channel connection signal CCS may have an activation level. The channel connection switch CCSW may connect the first electrode of the sampling capacitor SAMC and the first electrode of the reference capacitor REFC to each other in response to the channel connection signal CCS having the activation level. Therefore, the first electrode of the sampling capacitor SAMC and the first electrode of the reference capacitor REFC may have the same voltage (e.g., a voltage between the sensing voltage VSEN and the initialization voltage VINT), and the second electrode of the sampling capacitor SAMC and the second electrode of the reference capacitor REFC may have a voltage difference VSEN-VINT obtained by subtracting the initialization voltage VINT from the sensing voltage VSEN. The switch matrix 550 may connect the second electrode of the sampling capacitor SAMC and the second electrode of the reference capacitor REFC to a first input terminal and a second input terminal of the analog-to-digital converter 540, respectively, and the analog-to-digital converter 540 may convert the voltage difference VSEN-VINT into the sensing data SD.

Figure 11:
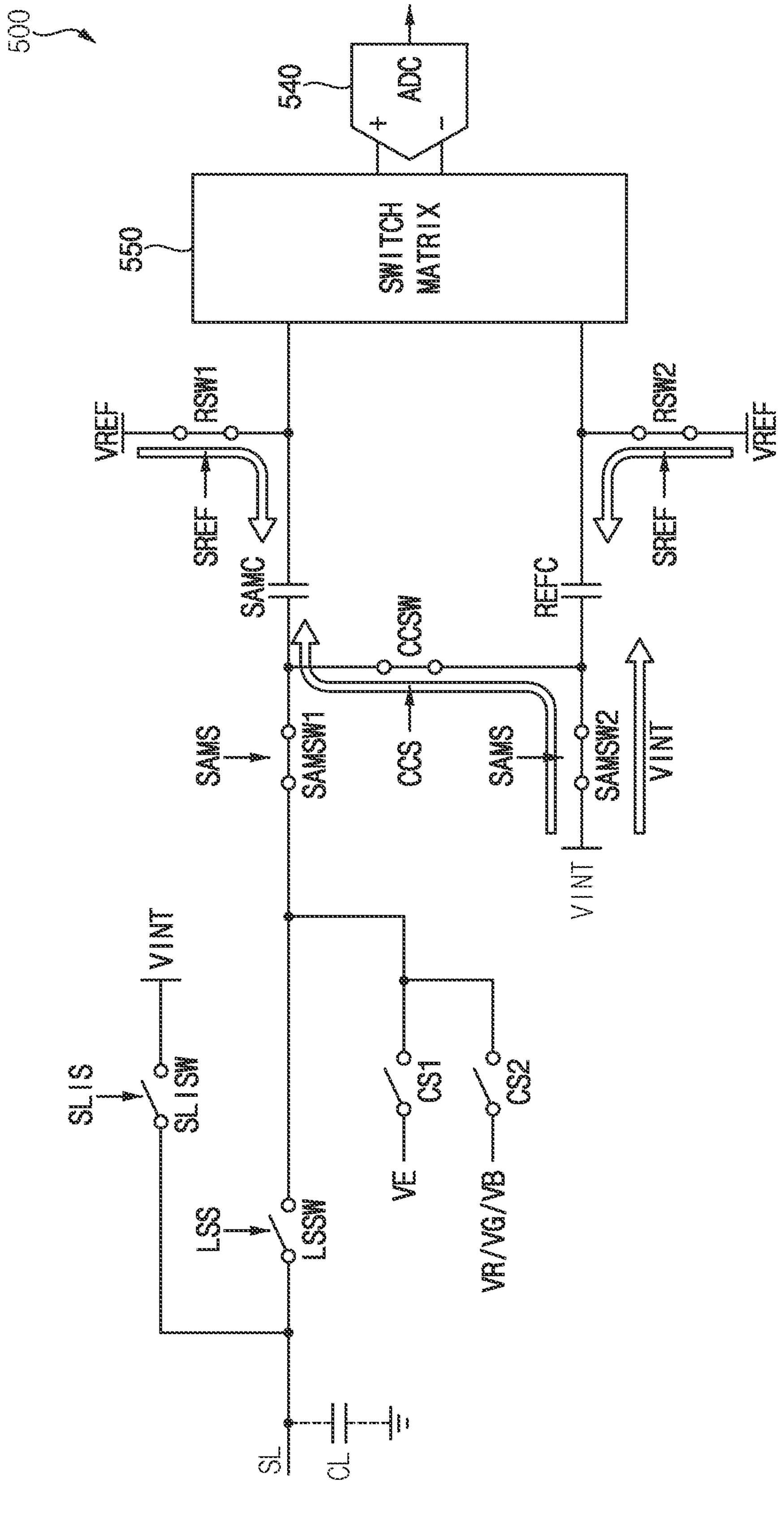
FIGS. 11 to 13 are schematic views showing an example in which the sensing circuit according to the method of compensating of FIG. 1 generates a first output value.
Figure 12:
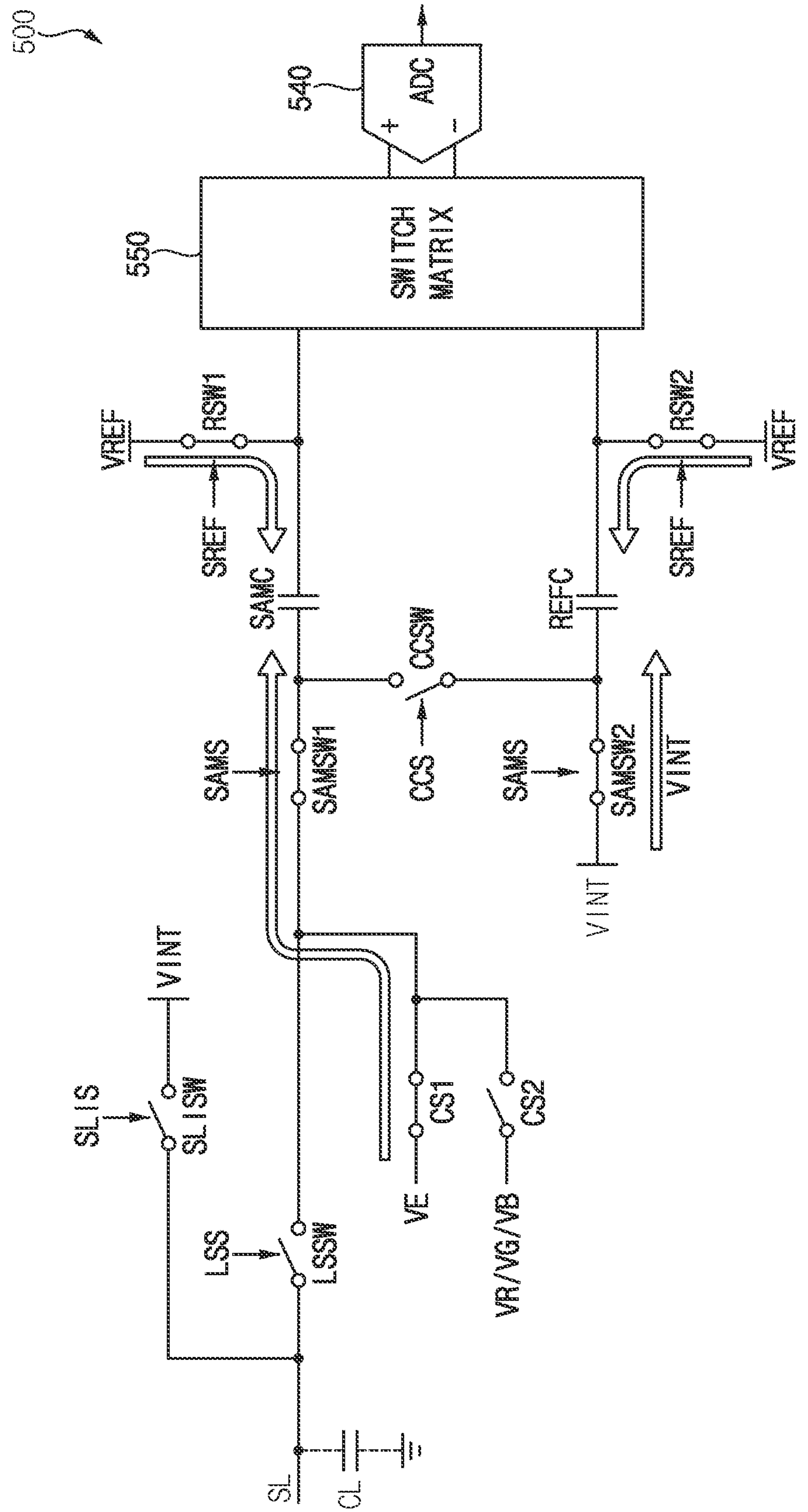
Figure 13:
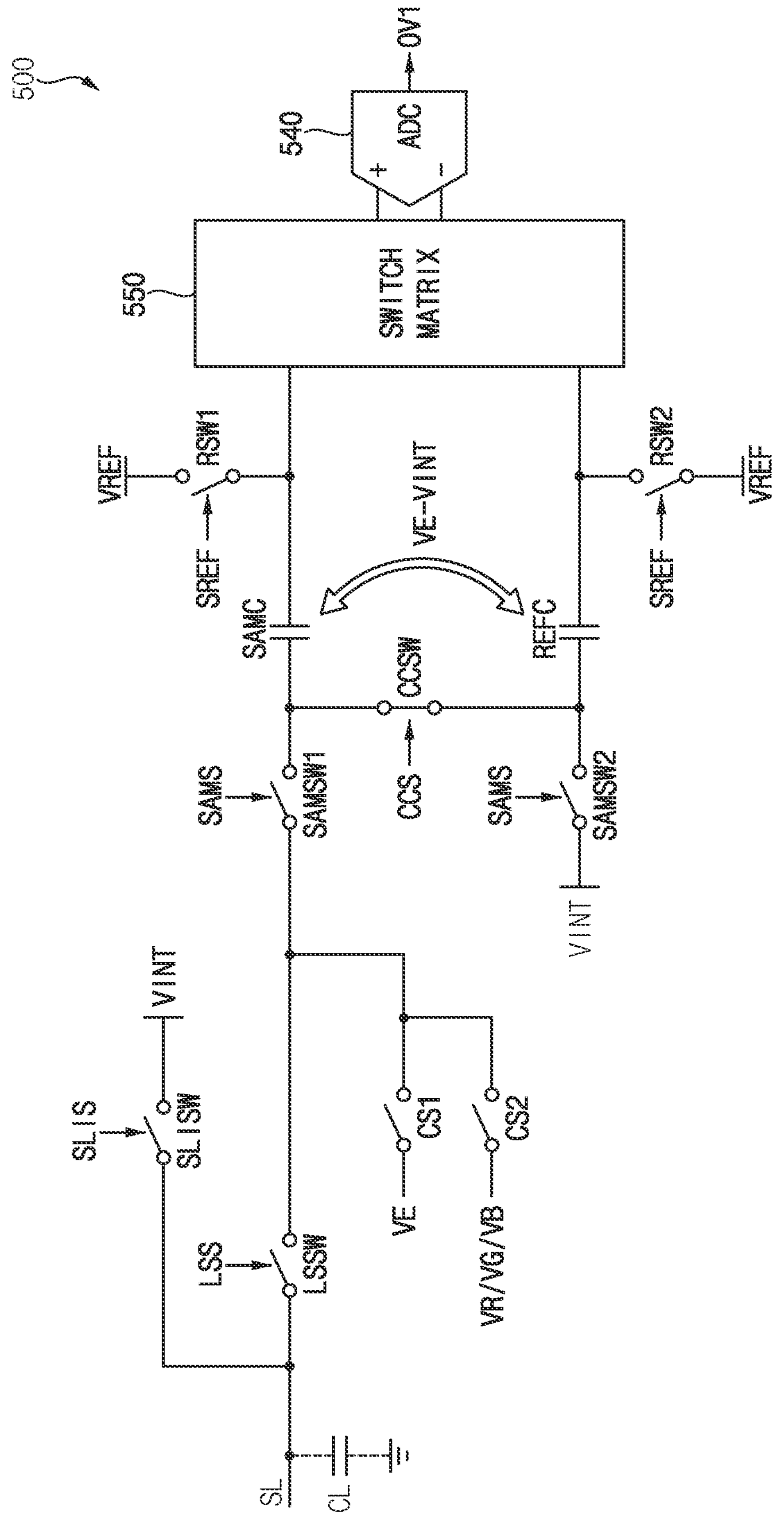

FIGS. 11 to 13 are schematic views showing an example in which the sensing circuit 500 according to the method of compensating of FIG. 1 generates a first output value OV1.

Referring to FIGS. 1, 2, and 11 to 13, the method of compensating of FIG. 1 may include measuring a first output value OV1 of a sensing circuit 500 that senses pixels P by applying an external voltage VE to the sensing circuit 500 (S100). The external voltage VE may be applied from an outside of the display device as a preset voltage.

The sensing circuit 500 may include a first compensation switch CS1 that is turned on to apply the external voltage VE to the sensing channel 520.

In the capacitor initialization period, as shown in FIG. 11, the sampling capacitor SAMC and the reference capacitor REFC may be initialized. For example, in the capacitor initialization period, the sampling signal SAMS, the reference signal SREF, and the channel connection signal CCS may have activation levels. The second sampling switch SAMSW2 may be turned on in response to the sampling signal SAMS having the activation level, and the channel connection switch CCSW may be turned on in response to the channel connection signal CCS having the activation level. Therefore, the initialization voltage VINT may be applied to the first electrode of the reference capacitor REFC through the second sampling switch SAMSW2, and may be applied to the first electrode of the sampling capacitor SAMC through the second sampling switch SAMSW2 and the channel connection switch CCSW. The first reference switch RSW1 and the second reference switch RSW2 may be turned on in response to the reference signal SREF having the activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2. Therefore, the sampling capacitor SAMC and the reference capacitor REFC may be initialized or discharged based on the initialization voltage VINT and the reference voltage VREF. According to an embodiment, the reference voltage VREF may have, but is not limited to, the same voltage level as the initialization voltage VINT.

In the sampling period, as shown in FIG. 12, the sensing channel 520 may sample the external voltage VE. For example, in the sampling period, the sampling signal SAMS and the reference signal SREF may have activation levels. The first compensation switch CS1 may be turned on, and the first sampling switch SAMSW1 and the second sampling switch SAMSW2 may be turned on in response to the sampling signal SAMS having the activation level. Therefore, the external voltage VE may be applied to the first electrode of the sampling capacitor SAMC through the first compensation switch CS1 and the first sampling switch SAMSW1, and the initialization voltage VINT may be applied to the first electrode of the reference capacitor REFC through the second sampling switch SAMSW2. The first reference switch RSW1 and the second reference switch RSW2 may be turned on in response to the reference signal SREF having the activation level. Therefore, the reference voltage VREF may be applied to the second electrode of the sampling capacitor SAMC through the first reference switch RSW1, and may be applied to the second electrode of the reference capacitor REFC through the second reference switch RSW2.

In the analog-to-digital conversion period, as shown in FIG. 13, the switch matrix 550 and the analog-to-digital converter 540 may convert the sampled external voltage VE into the first output value OV1. For example, the channel connection signal CCS may have an activation level. The channel connection switch CCSW may connect the first electrode of the sampling capacitor SAMC and the first electrode of the reference capacitor REFC to each other in response to the channel connection signal CCS having the activation level. Therefore, the first electrode of the sampling capacitor SAMC and the first electrode of the reference capacitor REFC may have the same voltage (e.g., a voltage between the external voltage VE and the initialization voltage VINT), and the second electrode of the sampling capacitor SAMC and the second electrode of the reference capacitor REFC may have a voltage difference VE-VINT obtained by subtracting the initialization voltage VINT from the external voltage VE. The switch matrix 550 may connect the second electrode of the sampling capacitor SAMC and the second electrode of the reference capacitor REFC to the first input terminal and the second input terminal of the analog-to-digital converter 540, respectively, and the analog-to-digital converter 540 may convert the voltage difference VE-VINT into the first output value OV1.

Figure 14:
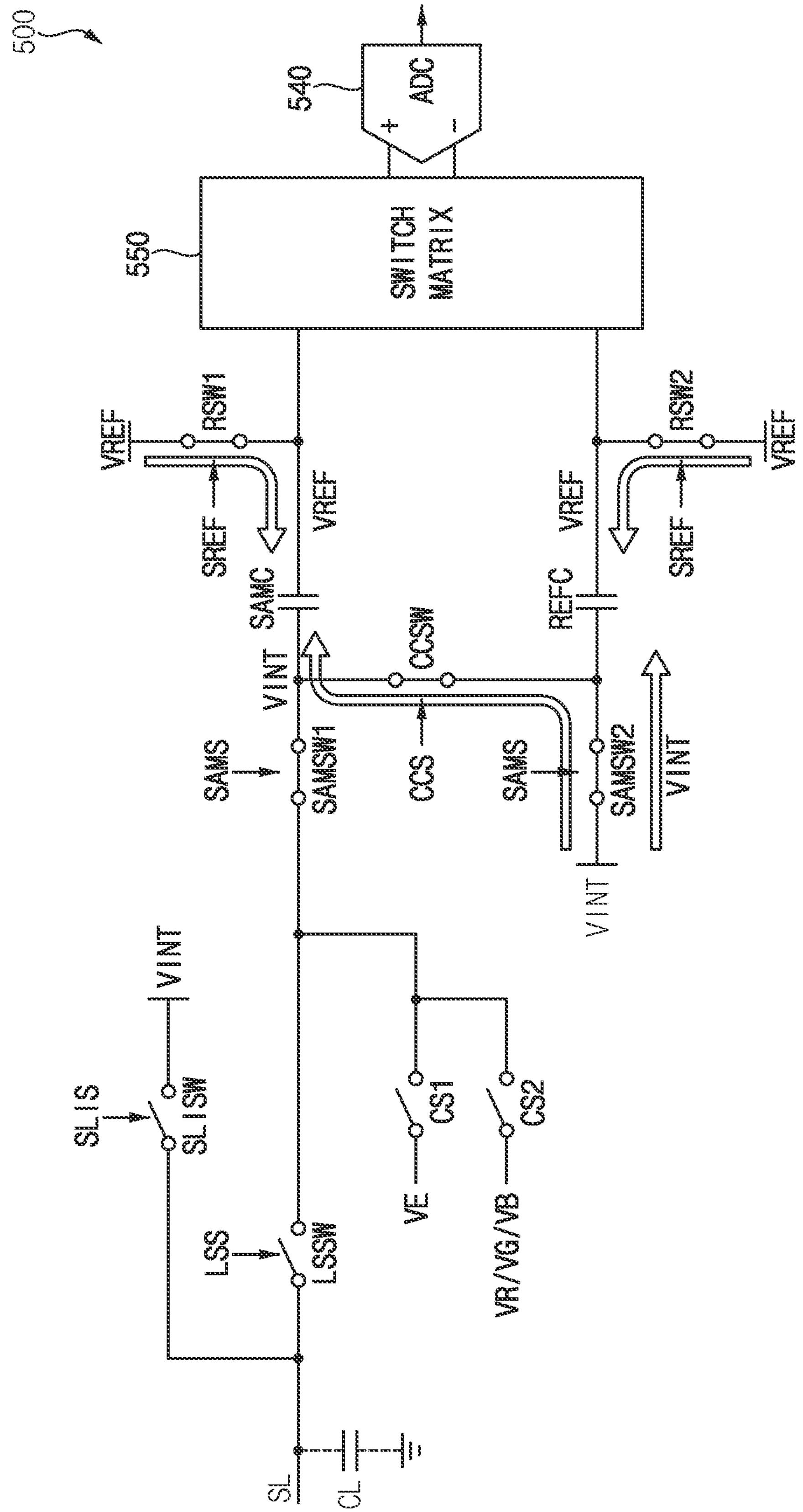
FIGS. 14 to 16 are schematic views showing an example in which the sensing circuit according to the method of compensating of FIG. 1 generates second output values.
Figure 15:
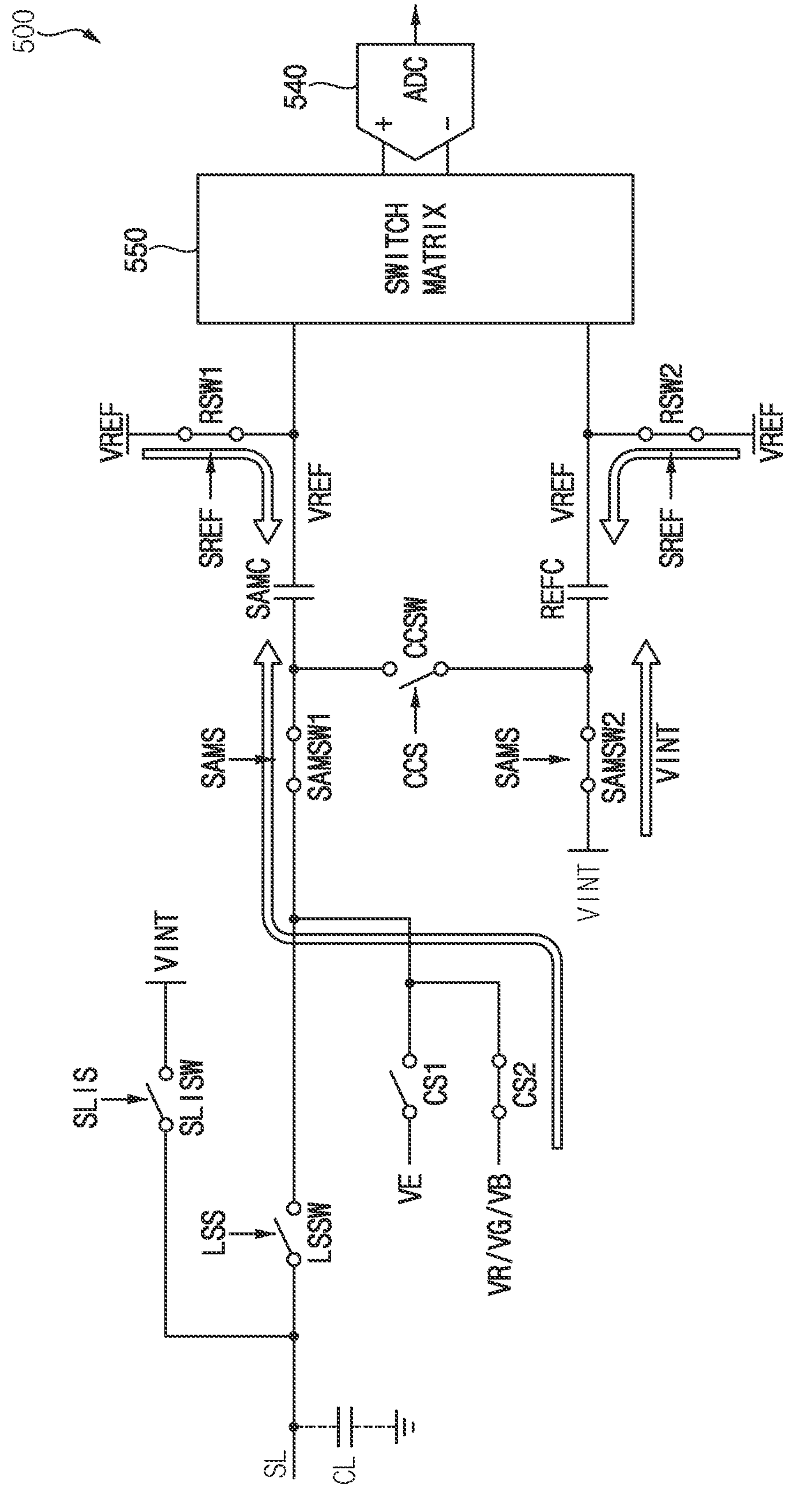
Figure 16:
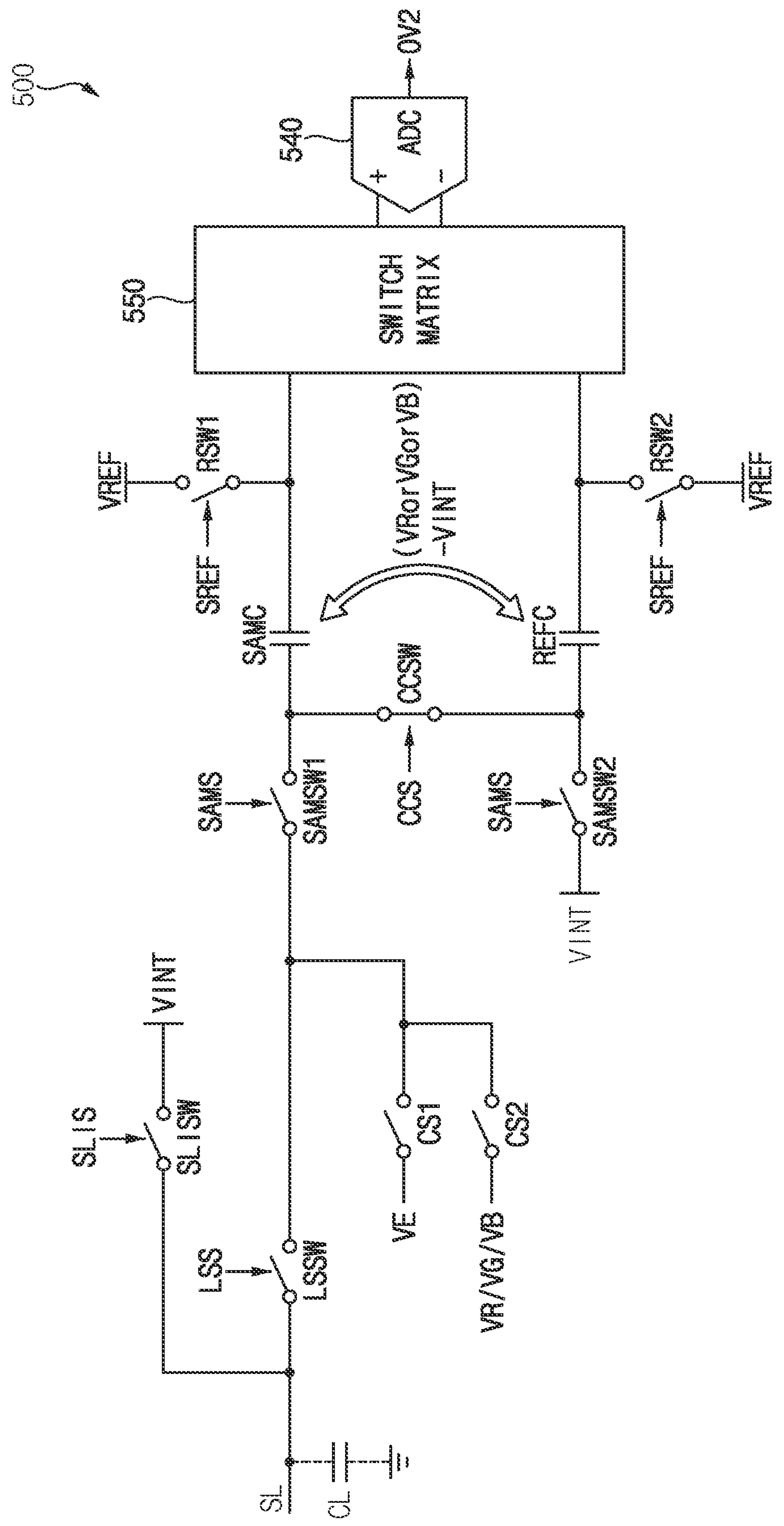

FIGS. 14 to 16 are schematic views showing an example in which the sensing circuit 500 according to the method of compensating of FIG. 1 generates second output values OV2.

Referring to FIGS. 1, 2, 4, and 14 to 16, the method of compensating of FIG. 1 may include measuring second output values OV2 of the sensing circuit 500 by applying output voltages within an output range of the data driver 400 to the sensing circuit 500 through output amplifiers 420 of the data driver 400 (S200). The second output values OV2 may be measured by applying the output voltages (i.e., the gray level voltages VR, VG, and VB) to the sensing channel 520.

The sensing circuit 500 may include a second compensation switch CS2 that is turned on to apply the gray level voltages VR, VG, and VB to the sensing channel 520. The applied gray level voltages VR, VG, and VB and the second output values OV2 will be described in detail below with reference to FIGS. 17 to 19.

In the capacitor initialization period, as shown in FIG. 14, the sampling capacitor SAMC and the reference capacitor REFC may be initialized. For example, in the capacitor initialization period, the sampling signal SAMS, the reference signal SREF, and the channel connection signal CCS may have activation levels. The second sampling switch SAMSW2 may be turned on in response to the sampling signal SAMS having the activation level, and the channel connection switch CCSW may be turned on in response to the channel connection signal CCS having the activation level. Therefore, the initialization voltage VINT may be applied to the first electrode of the reference capacitor REFC through the second sampling switch SAMSW2, and may be applied to the first electrode of the sampling capacitor SAMC through the second sampling switch SAMSW2 and the channel connection switch CCSW. The first reference switch RSW1 and the second reference switch RSW2 may be turned on in response to the reference signal SREF having the activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2. Therefore, the sampling capacitor SAMC and the reference capacitor REFC may be initialized or discharged based on the initialization voltage VINT and the reference voltage VREF. According to an embodiment, the reference voltage VREF may have, but is not limited to, the same voltage level as the initialization voltage VINT.

In the sampling period, as shown in FIG. 15, the sensing channel 520 may sample the gray level voltages VR, VG, and VB. For example, in the sampling period, the sampling signal SAMS and the reference signal SREF may have activation levels. The second compensation switch CS2 may be turned on, and the first sampling switch SAMSW1 and the second sampling switch SAMSW2 may be turned on in response to the sampling signal SAMS having the activation level. Therefore, the gray level voltages VR, VG, and VB may be applied to the first electrode of the sampling capacitor SAMC through the second compensation switch CS2 and the first sampling switch SAMSW1, and the initialization voltage VINT may be applied to the first electrode of the reference capacitor REFC through the second sampling switch SAMSW2. The first reference switch RSW1 and the second reference switch RSW2 may be turned on in response to the reference signal SREF having the activation level. Therefore, the reference voltage VREF is applied to the second electrode of the sampling capacitor SAMC through the first reference switch RSW1, and may be applied to the second electrode of the reference capacitor REFC through the second reference switch RSW2.

In the analog-to-digital conversion period, as shown in FIG. 16, the switch matrix 550 and the analog-to-digital converter 540 may convert the sampled gray level voltages VR, VG, and VB into the second output values OV2. For example, the channel connection signal CCS may have an activation level. The channel connection switch CCSW may connect the first electrode of the sampling capacitor SAMC and the first electrode of the reference capacitor REFC to each other in response to the channel connection signal CCS having the activation level. Therefore, the first electrode of the sampling capacitor SAMC and the first electrode of the reference capacitor REFC may have the same voltage (e.g., a voltage between the gray level voltages VR, VG, and VB and the initialization voltage VINT), and the second electrode of the sampling capacitor SAMC and the second electrode of the reference capacitor REFC may have a voltage difference (VR or VG or VB)-VINT obtained by subtracting the initialization voltage VINT from the gray level voltages VR, VG, and VB. The switch matrix 550 may connect the second electrode of the sampling capacitor SAMC and the second electrode of the reference capacitor REFC to the first input terminal and the second input terminal of the analog-to-digital converter 540, respectively, and the analog-to-digital converter 540 may convert the voltage difference (VR or VG or VB)-VINT into the second output value OV2.

FIGS. 7 to 10 may be a sensing operation performed in case that the display device is actually driven. FIGS. 11 to 16 may be an operation for generating the compensation look-up table 430 in a stage before assembly of the display device.

In other words, the first output value OV1 and the second output values OV2 may be measured to generate the compensation look-up table 430 in the stage before the assembly of the display device. Therefore, the number of the sensing channels 520 to measure the output values OV1 and OV2 is not limited.

For example, according to the method of compensating of FIG. 1, all of the second output values OV2 for the gray level voltages VR, VG, and VB of the output amplifiers 420, respectively, may be measured by using one sensing channel 520.

As another example, according to the method of compensating of FIG. 1, the second output values OV2 may be measured at once by using all of the sensing channels 520 that will be used in the display device. In this case, the first output value OV1 may be measured separately in each of the sensing channels 520. However, the disclosure is not limited thereto. For example, the first output value OV1 measured by one of the sensing channels 520 may be used.

In other words, according to the method of compensating of FIG. 1, a measurement time may be shortened by using a plurality of sensing channels 520.

Figure 17:
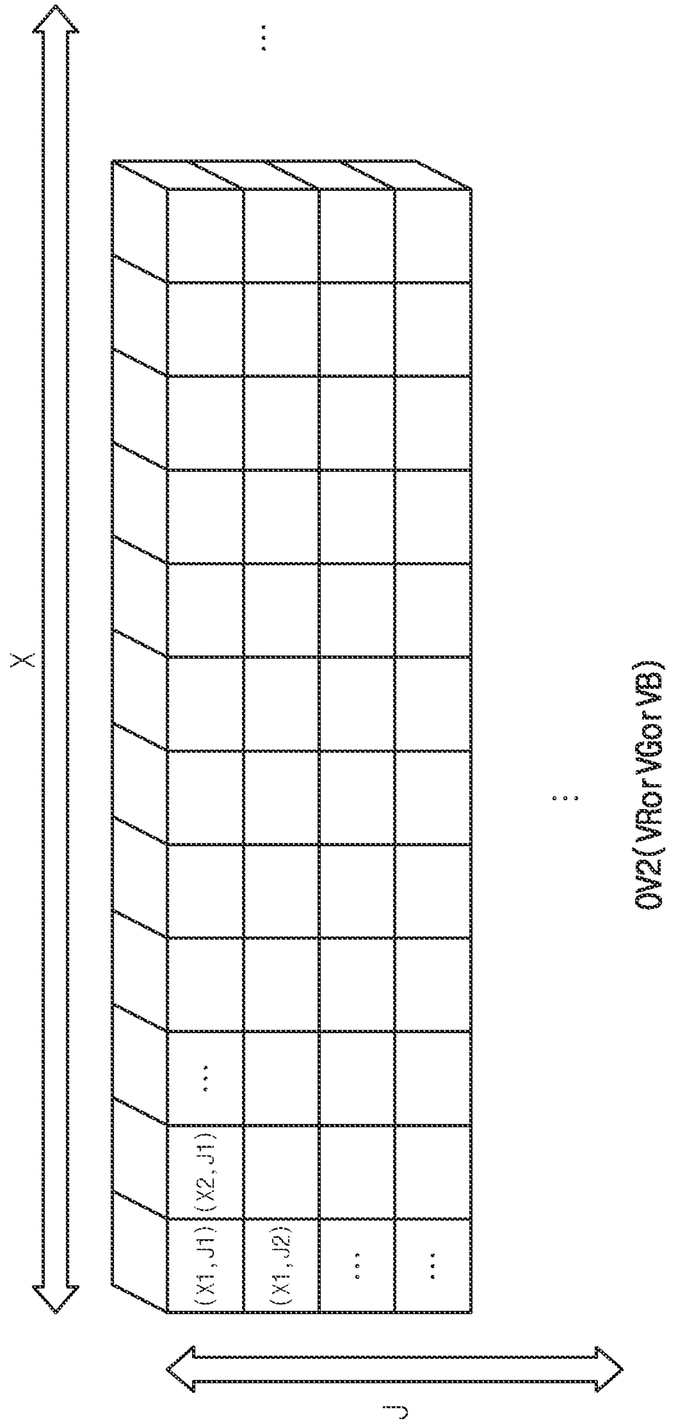
FIG. 17 is a schematic view showing an example of the second output values according to the method of compensating of FIG. 1.
Figure 18:
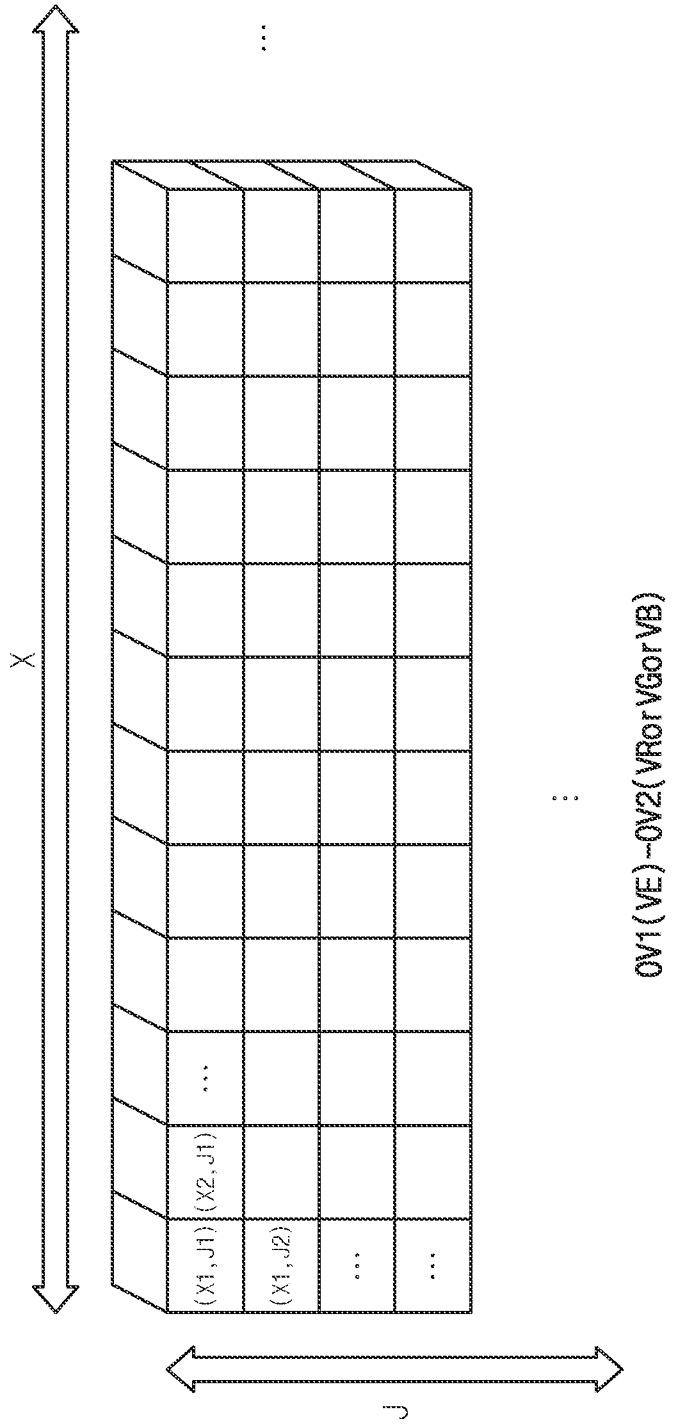
FIG. 18 is a schematic view showing an example of differences between the first output value and the second output values according to the method of compensating of FIG. 1.
Figure 19:
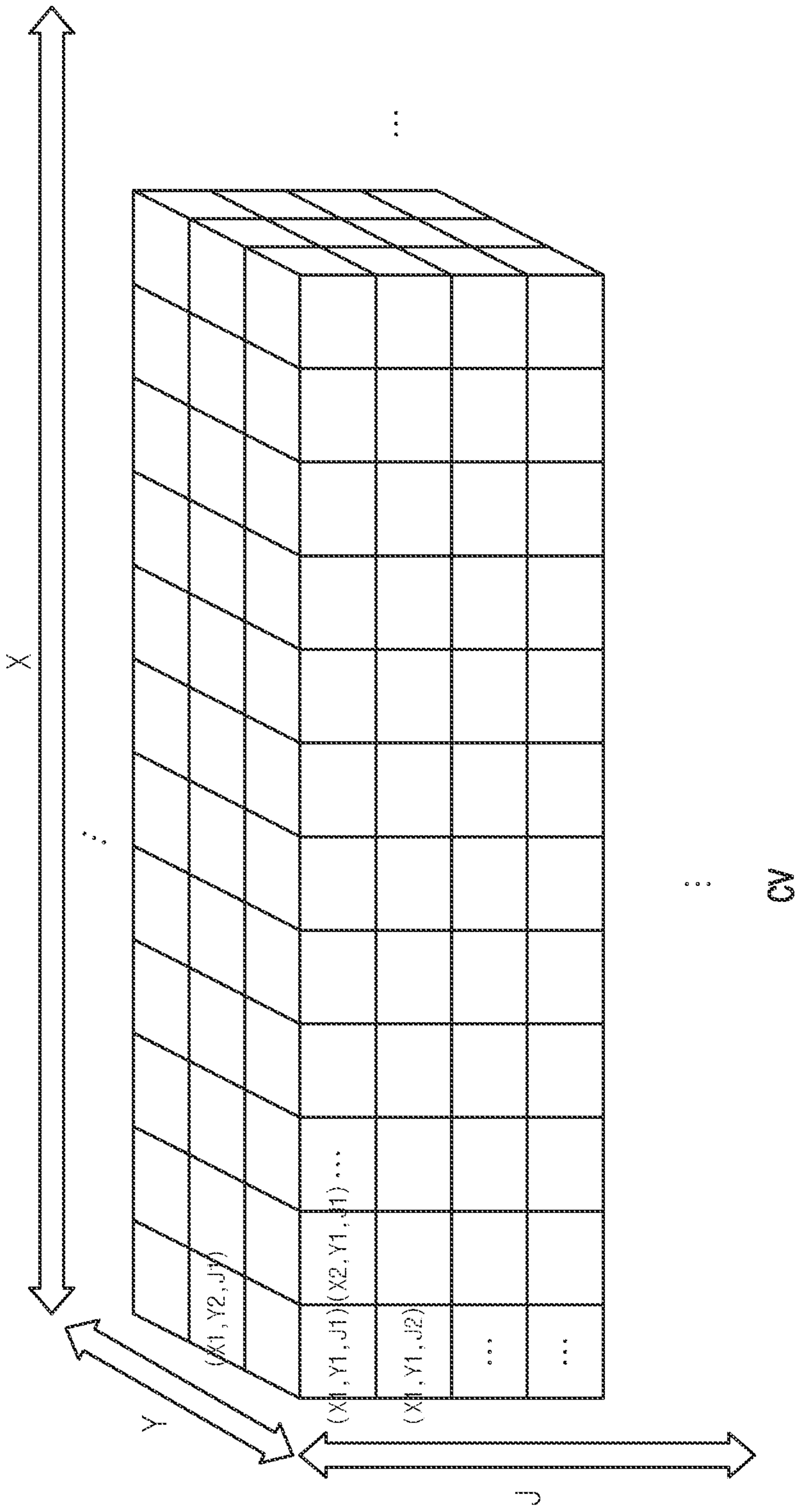
FIG. 19 is a schematic view showing an example of compensation values according to the method of compensating of FIG. 1.

FIG. 17 is a schematic view showing an example of the second output values OV2 according to the method of compensating of FIG. 1, FIG. 18 is a schematic view showing an example of differences between the first output value OV1 and the second output values OV2 according to the method of compensating of FIG. 1, and FIG. 19 is a schematic view showing an example of compensation values CV according to the method of compensating of FIG. 1.

Referring to FIGS. 2 to 4 and 17, the data driver 400 may output the gray level voltages VR, VG, and VB as the output voltages. The method of compensating of FIG. 1 may include measuring the second output values OV2 for a first color by applying the gray level voltages VR for the first color to the sensing circuit 500 through the output amplifiers 420 for the first color, measuring the second output values OV2 for a second color by applying the gray level voltages VG for the second color to the sensing circuit 500 through the output amplifiers 420 for the second color, and measuring the second output values OV2 for a third color by applying the gray level voltages VB for the third color to the sensing circuit 500 through the output amplifiers 420 for the third color. The number of the second output values OV2 for each of the colors may be equal to the number of gray levels multiplied by the horizontal resolution.

For example, the method of compensating of FIG. 1 may include measuring the second output values OV2 for the gray level voltages VR, VG, and VB by connecting each of the output amplifiers 420 to the sensing circuit 500. In other words, in case that the display device displays 256 gray levels from 0 to 255, the output amplifiers 420 for the first color may output the gray level voltages VR for the first color corresponding to the gray levels from 0 to 255 to the sensing circuit 500, respectively, and the method of compensating of FIG. 1 may include measuring 256 second output values OV2 by the output amplifiers 420 for the first color, respectively. Since the number of the output amplifiers 420 for each of the colors is equal to the horizontal resolution of the display panel 100, the number of the second output values OV2 for each of the colors may be equal to the number of the gray levels multiplied by the horizontal resolution. Therefore, as shown in FIG. 17, in case that the horizontal resolution is X, and the number of the gray levels is J, the number of the second output values OV2 for each of the colors may be X×J. In case that the display device displays three colors, the second output values OV2 may include X×J three data sets.

Referring to FIGS. 2 to 4, 18, and 19, the compensation look-up table 430 may be generated based on the differences between the first output value OV1 and the second output values OV2. In other words, in case that there are no output deviations of the output amplifiers 420, ideally, the differences between the first output value OV1 and the second output values OV2 for all the gray level voltages VR, VG, and VB among the output amplifiers 420 for the same color may be constant.

The compensation look-up table 430 may include compensation values CV for compensating for deviations of the output amplifiers 420 for differences between the first output value OV1 and the second output values OV2. Therefore, the compensation values CV may be added to the output voltages of the data driver 400 (i.e., the gray level voltages VR, VG, and VB) so that output deviations of the output amplifiers 420 may be minimized. In other words, the compensation values CV may be values that allow the differences between the first output value OV1 and the second output values OV2 among the output amplifiers 420 to be constant.

For example, it will be assumed that the difference between the first output value OV1 and the second output value OV2 is 0.1V in case that a reference output amplifier for the first color outputs a gray level voltage corresponding to a 255-gray level to the sensing circuit 500, and the difference between the first output value OV1 and the second output value OV2 is 0.15V in case that a specific output amplifier for the first color outputs the gray level voltage corresponding to the 255-gray level to the sensing circuit 500. In this case, in case that a compensation value for the 255-gray level and the specific output amplifier (i.e., pixels P connected to the specific output amplifier) is added to the gray level voltage corresponding to the 255-gray level output from the specific output amplifier, the difference between the first output value OV1 and the second output value OV2 of the specific output amplifier may be 0.1V.

The number of the compensation values CV for each of the colors may be equal to the number of the gray levels multiplied by the horizontal resolution multiplied by a vertical resolution of the display panel 100. The compensation values CV may be values applied to all the pixels P. Therefore, the method of compensating of FIG. 1 may include generating the compensation look-up table 430 by duplicating data on the differences between the first output value OV1 and the second output values OV2 as much as the vertical resolution.

For example, in case that the horizontal resolution is X, the number of the gray levels is J, and the vertical resolution is Y, the differences between the first output value OV1 and the second output values OV2 for each of the colors may be X×J. In this case, the compensation values CV for the pixels P, respectively, may be calculated by duplicating X×J differences Y times. In other words, since the pixels P included in the same pixel column are connected to the same data line DL, the same compensation values CV may be applied to the pixels P included in the same pixel column.

Figure 20:
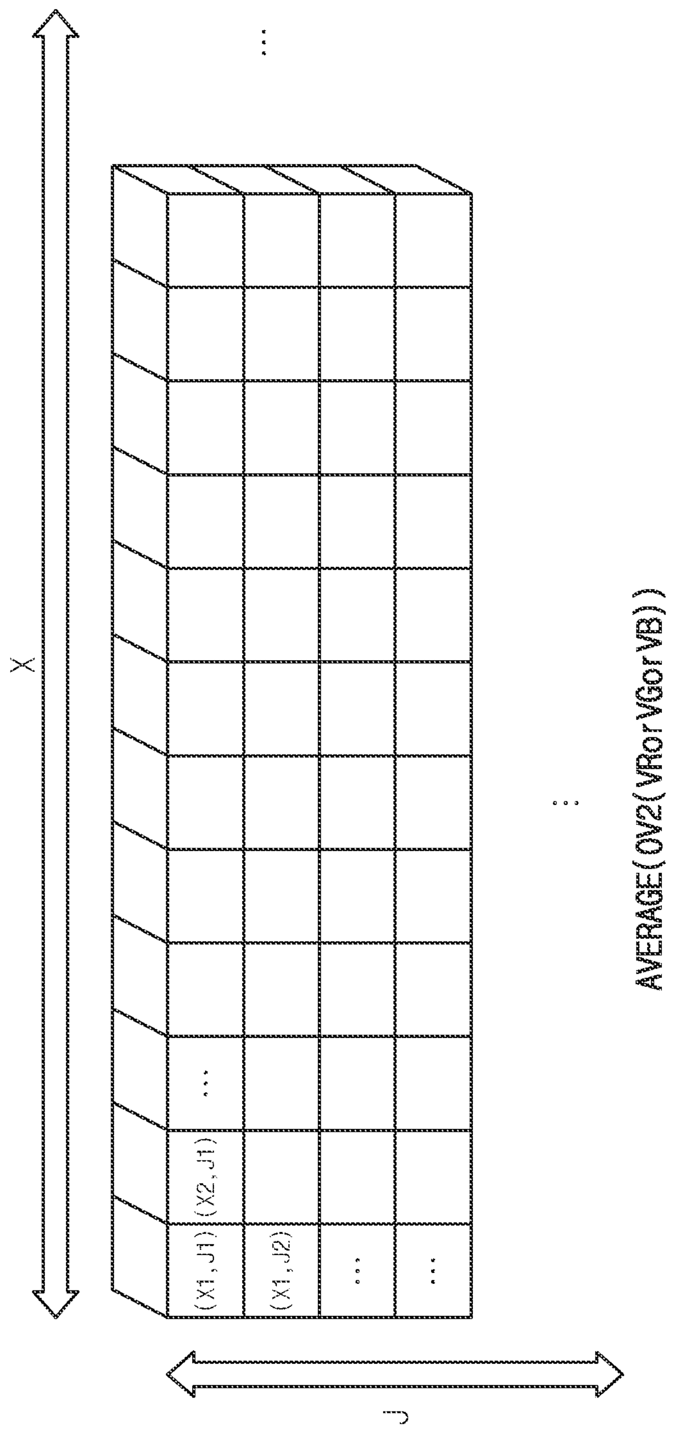
FIG. 20 is a schematic view showing an example of second output values according to a method of compensating for an output of a data driver according to embodiments of the disclosure.

FIG. 20 is a schematic view showing an example of second output values OV2 according to a method of compensating for an output of a data driver 400 according to embodiments of the disclosure.

Since a method of compensating for an output according to the embodiments may be substantially the same as the method of compensating of FIG. 1 except that average values of the second output values OV2 are used, the same reference numerals and reference signs will be used for the same or similar elements, and redundant descriptions will be omitted.

Referring to FIGS. 2, 4, and 20, the method of compensating of FIG. 20 may include repeatedly applying the same output voltages to the sensing circuit 500 through the output amplifiers 420, and calculating average values of the second output values OV2 for the same output voltages. The compensation look-up table 430 may be generated based on the average values.

According to the method of compensating of FIG. 20, each of the gray level voltages VR, VG, and VB may be applied to the sensing circuit 500 at least two times, and the compensation look-up table 430 may be generated through the average values of the second output values OV2, so that the output deviations of the data driver 400 may be compensated more accurately.

Figure 21:
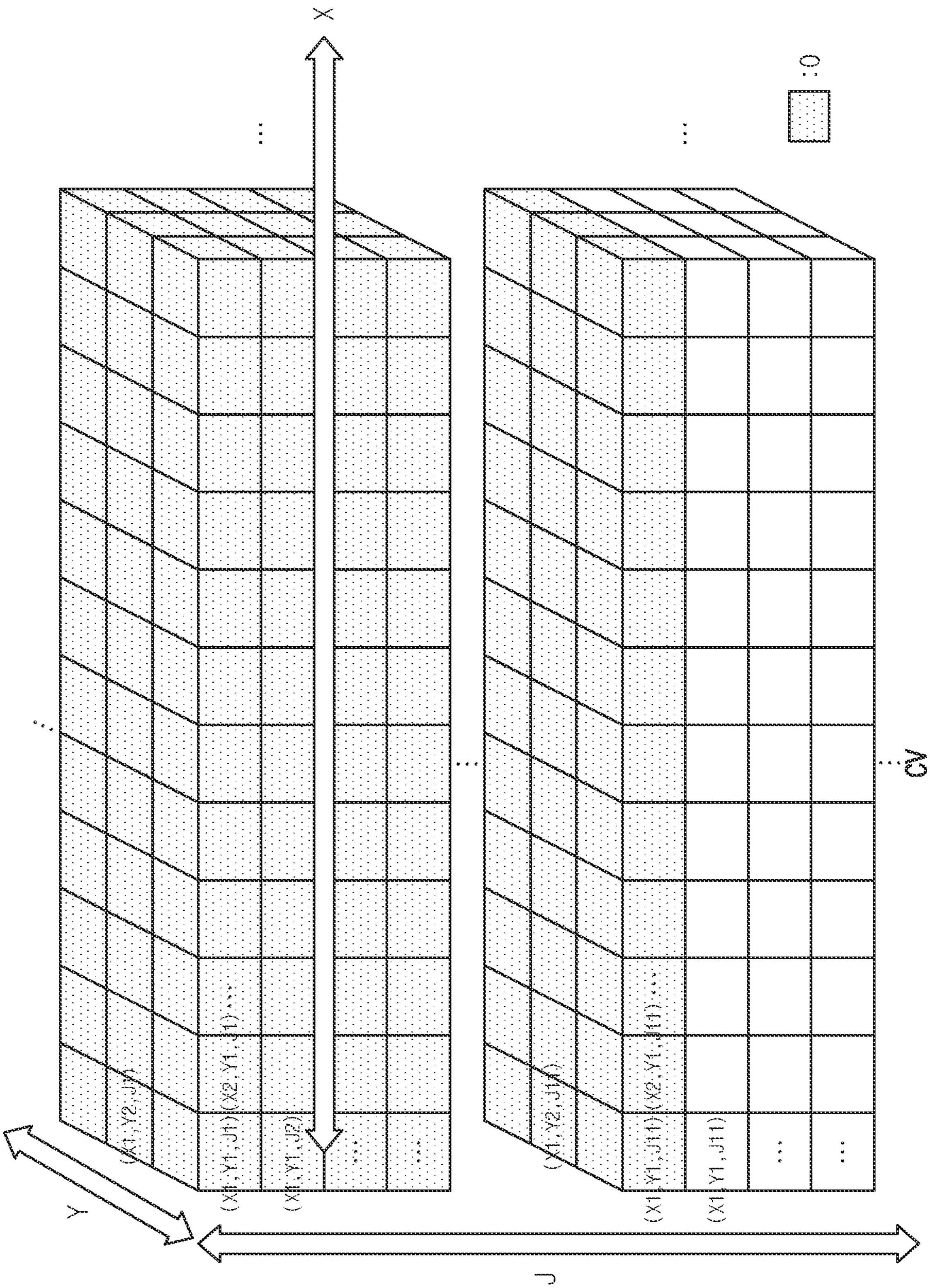
FIG. 21 is a schematic view showing an example of compensation values according to a method of compensating for an output of a data driver according to embodiments of the disclosure.

FIG. 21 is a schematic view showing an example of compensation values CV according to a method of compensating for an output of a data driver 400 according to embodiments of the disclosure.

Since a method of compensating for an output according to the embodiments may be substantially the same as the method of compensating of FIG. 1 except for the compensation values CV, the same reference numerals and reference signs will be used for the same or similar elements, and redundant descriptions will be omitted.

Referring to FIGS. 2, 4, and 21, the compensation values CV for the gray level voltages VR, VG, and VB corresponding to a reference gray level or less may be 0. In other words, the method of compensating of FIG. 21 may not compensate for the gray level voltages VR, VG, and VB corresponding to the reference gray level or less. For example, as shown in FIG. 21, the compensation values CV for the gray level voltages VR, VG, and VB corresponding to a 10-gray level or less (i.e., from J1 to J11) may be 0. Accordingly, according to the method of compensating of FIG. 21, complexity of an operation for compensating for the output voltages of the data driver 400 may be reduced.

Figure 22:
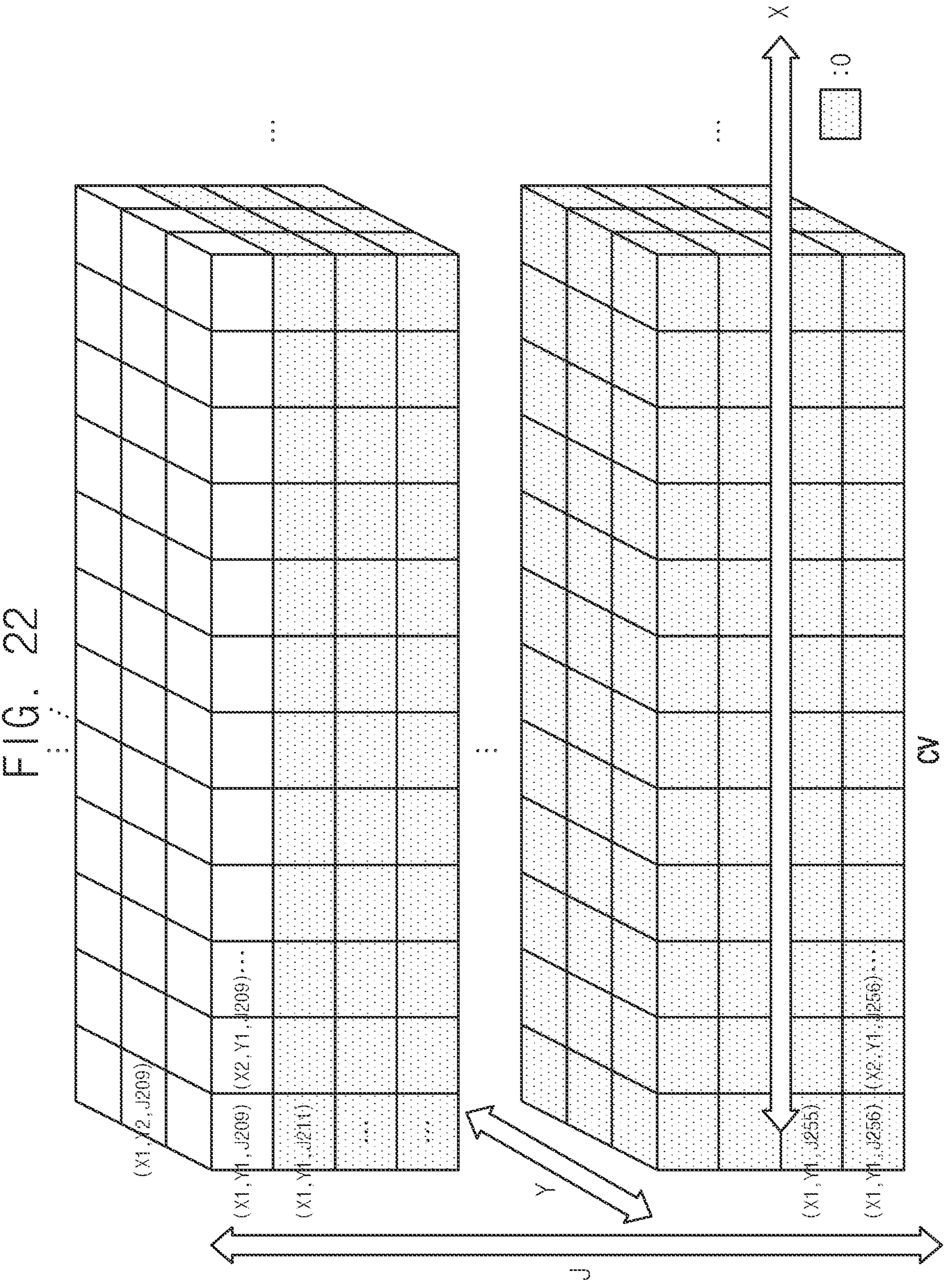
FIG. 22 is a schematic view showing an example of compensation values according to a method of compensating for an output of a data driver according to embodiments of the disclosure.

FIG. 22 is a schematic view showing an example of compensation values CV according to a method of compensating for an output of a data driver 400 according to embodiments of the disclosure.

Since a method of compensating for an output according to the embodiments may be substantially the same as the method of compensating of FIG. 1 except for the compensation values CV, the same reference numerals and reference signs will be used for the same or similar elements, and redundant descriptions will be omitted.

Referring to FIGS. 2, 4, and 22, the compensation values CV for the gray level voltages VR, VG, and VB corresponding to a reference gray level or more may be 0. In other words, the method of compensating of FIG. 22 may not compensate for the gray level voltages VR, VG, and VB corresponding to the reference gray level or more. For example, as shown in FIG. 22, the compensation values CV for the gray level voltages VR, VG, and VB corresponding to a 210-gray level or more (i.e., from J211 to J256) may be 0. Accordingly, according to the method of compensating of FIG. 22, complexity of an operation for compensating for the output voltages of the data driver 400 may be reduced.

Figure 23:
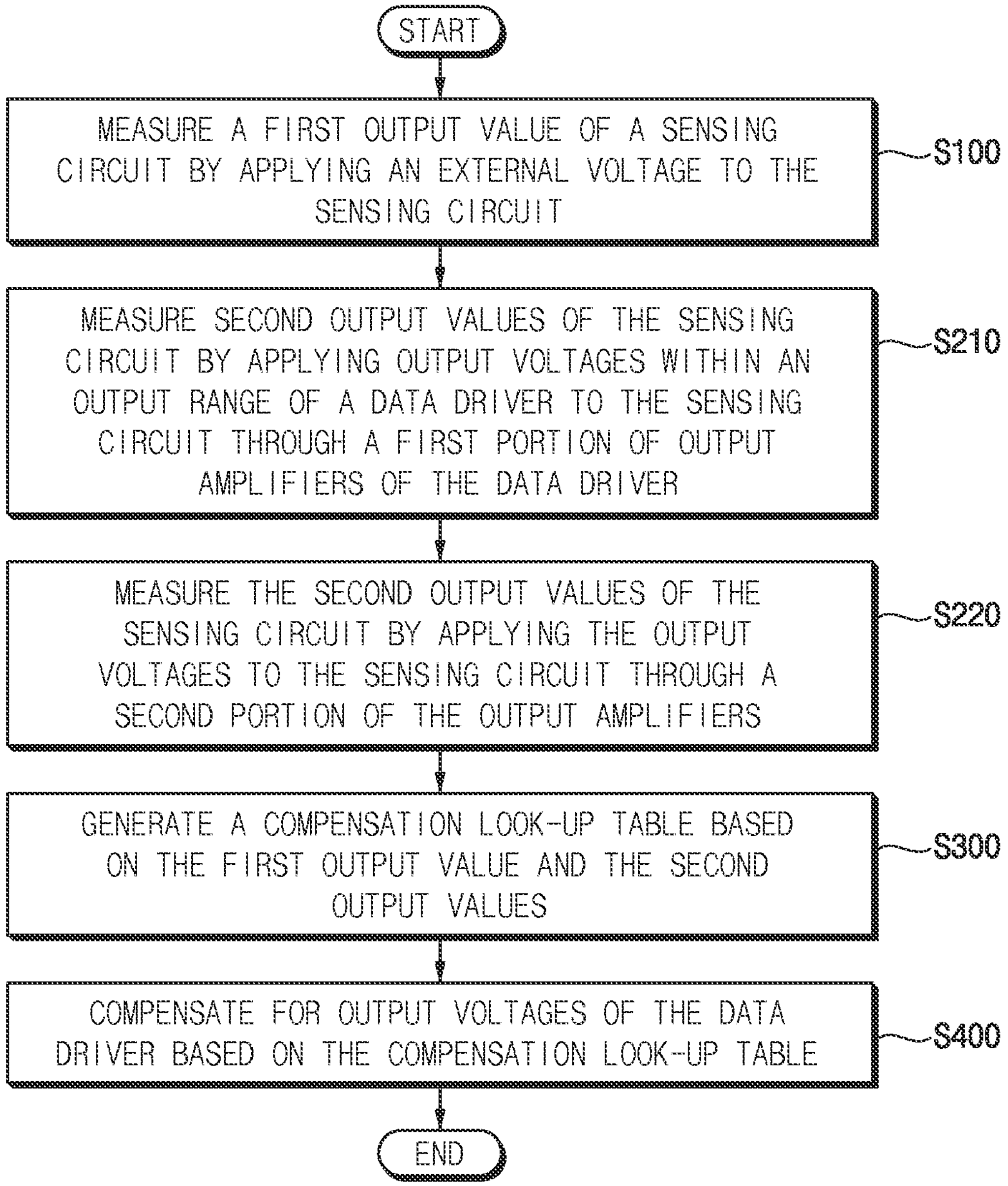
FIG. 23 is a flowchart showing a method of compensating for an output of a data driver according to an embodiment of the disclosure.

FIG. 23 is a flowchart showing a method of compensating for an output of a data driver 400 according to an embodiment of the disclosure.

Since a method of compensating for an output according to the embodiments may be substantially the same as the method of compensating of FIG. 1 except that two sensing lines SL1 and SL2 are connected to one sensing channel 620, the same reference numerals and reference signs will be used for the same or similar elements, and redundant descriptions will be omitted.

Referring to FIG. 23, the method of compensating of FIG. 23 may include measuring a first output value of a sensing circuit that senses pixels by applying an external voltage to the sensing circuit (S100), measuring second output values of the sensing circuit by applying output voltages within an output range of the data driver to the sensing circuit through a first portion of output amplifiers of the data driver (S210), measuring the second output values of the sensing circuit by applying the output voltages to the sensing circuit through a second portion of the output amplifiers (S220), generating a compensation look-up table based on the first output value and the second output values (S300), and compensating for the output voltages of the data driver based on the compensation look-up table (S400).

For example, the first portion may be odd-numbered output amplifiers among the output amplifiers. The second portion may be even-numbered output amplifiers among the output amplifiers.

Hereinafter, the above configuration will be described in detail.

Figure 24:
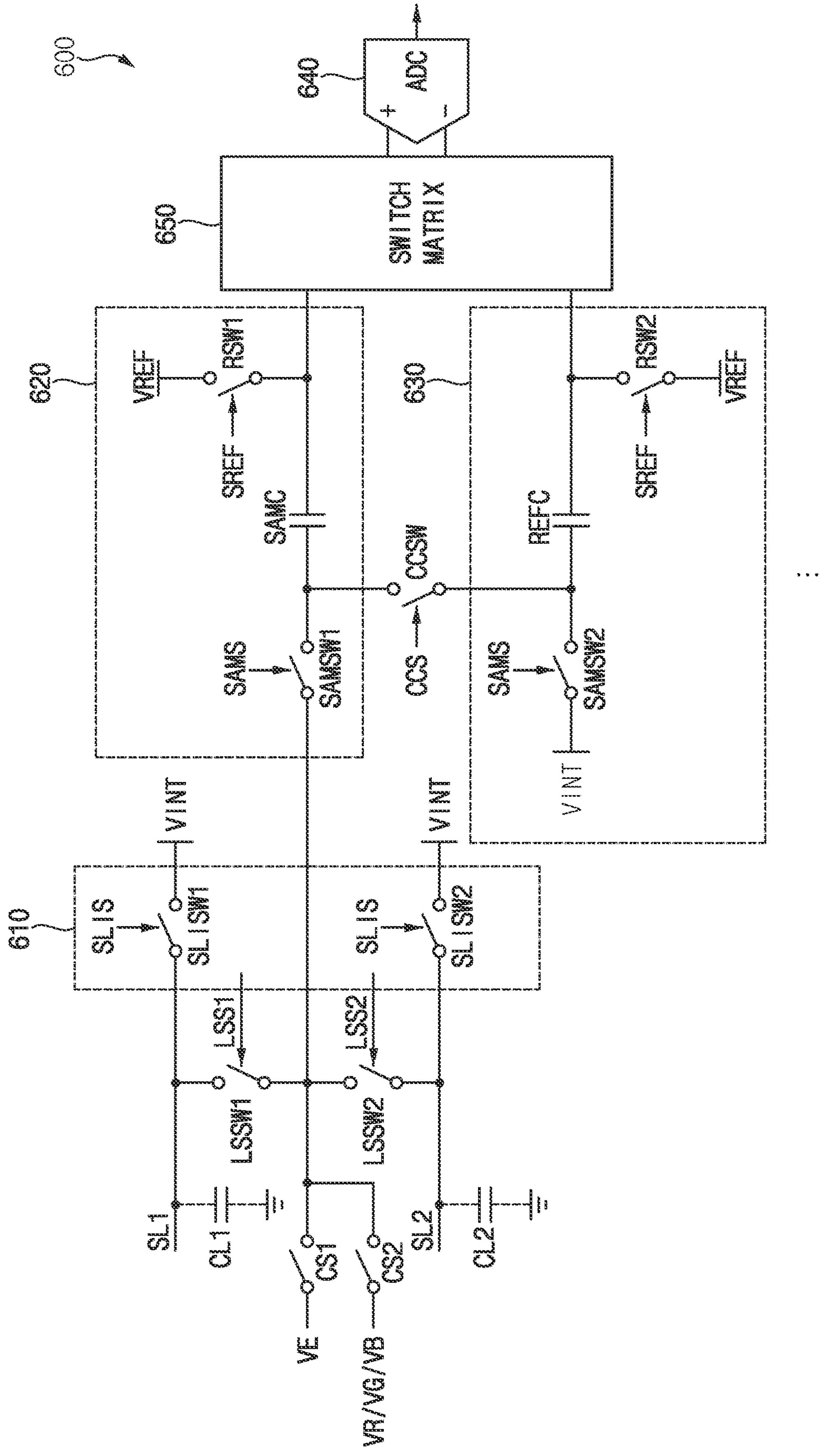
FIG. 24 is a schematic diagram of a circuit showing an example of a sensing circuit according to the method of compensating of FIG. 23.

FIG. 24 is a schematic diagram of a circuit showing an example of a sensing circuit 600 according to the method of compensating of FIG. 23, and FIGS. 25 to 32 are schematic diagrams of a circuit showing an example in which the sensing circuit 600 according to the method of compensating of FIG. 23 generates sensing data SD. Since a first compensation switch CS1 and a second compensation switch CS2 are structures that generate the compensation lookup table (430 in FIG. 4), the first compensation switch CS1 and the second compensation switch CS2 will be described below with reference to FIGS. 33 to 38.

Referring to FIGS. 24 to 32, the sensing circuit 600 may include a sensing line initialization circuit 610 that simultaneously initializes a first sensing line SL1 and a second sensing line SL2, a first line selection switch LSSW1 that connects the first sensing line SL1 to a sensing channel 620, a second line selection switch LSSW2 that connects the second sensing line SL2 to the sensing channel 620, and the sensing channel 620 that samples a first sensing voltage VSEN1 of the first sensing line SL1, and sample a second sensing voltage VSEN2 of the second sensing line SL2. The sensing circuit 600 may include a reference channel 630 and a channel connection switch CCSW. The sensing circuit 600 may include an analog-to-digital converter 640 and a switch matrix 650 that connects the sensing channel 620 to the analog-to-digital converter 640.

The sensing circuit 600 may include sensing channels 620 connected to two sensing lines SL1 and SL2. The switch matrix 650 may select and connect at least one of the sensing channels 620 to the analog-to-digital converter 640.

The sensing circuit 600 may include reference channels 630 connected to the sensing channels 620, respectively. The switch matrix 650 may connect at least one of the reference channels 630 to the analog-to-digital converter 640.

The sensing line initialization circuit 610 may include a first sensing line initialization switch SLISW1 that applies an initialization voltage VINT to the first sensing line SL1 in response to a sensing line initialization signal SLIS, and a second sensing line initialization switch SLISW2 that applies the initialization voltage VINT to the second sensing line SL2 in response to the sensing line initialization signal SLIS.

The sensing channel 620 may include a sampling capacitor SAMC having a first electrode and a second electrode, a first sampling switch SAMSW1 that connects the first and second line selection switches LSSW1 and LSSW2 to the first electrode of the sampling capacitor SAMC in response to a sampling signal SAMS, and a first reference switch RSW1 that applies a reference voltage VREF to the second electrode of the sampling capacitor SAMC in response to a reference signal SREF.

The reference channel 630 may include a reference capacitor REFC having a first electrode and a second electrode, a second sampling switch SAMSW2 that applies the initialization voltage VINT to the first electrode of the reference capacitor REFC in response to the sampling signal SAMS, and a second reference switch RSW2 that applies the reference voltage VREF to the second electrode of the reference capacitor REFC in response to the reference signal SREF.

The channel connection switch CCSW may connect the first electrode of the sampling capacitor SAMC and the first electrode of the reference capacitor REFC to each other in response to a channel connection signal CCS.

Figure 25:
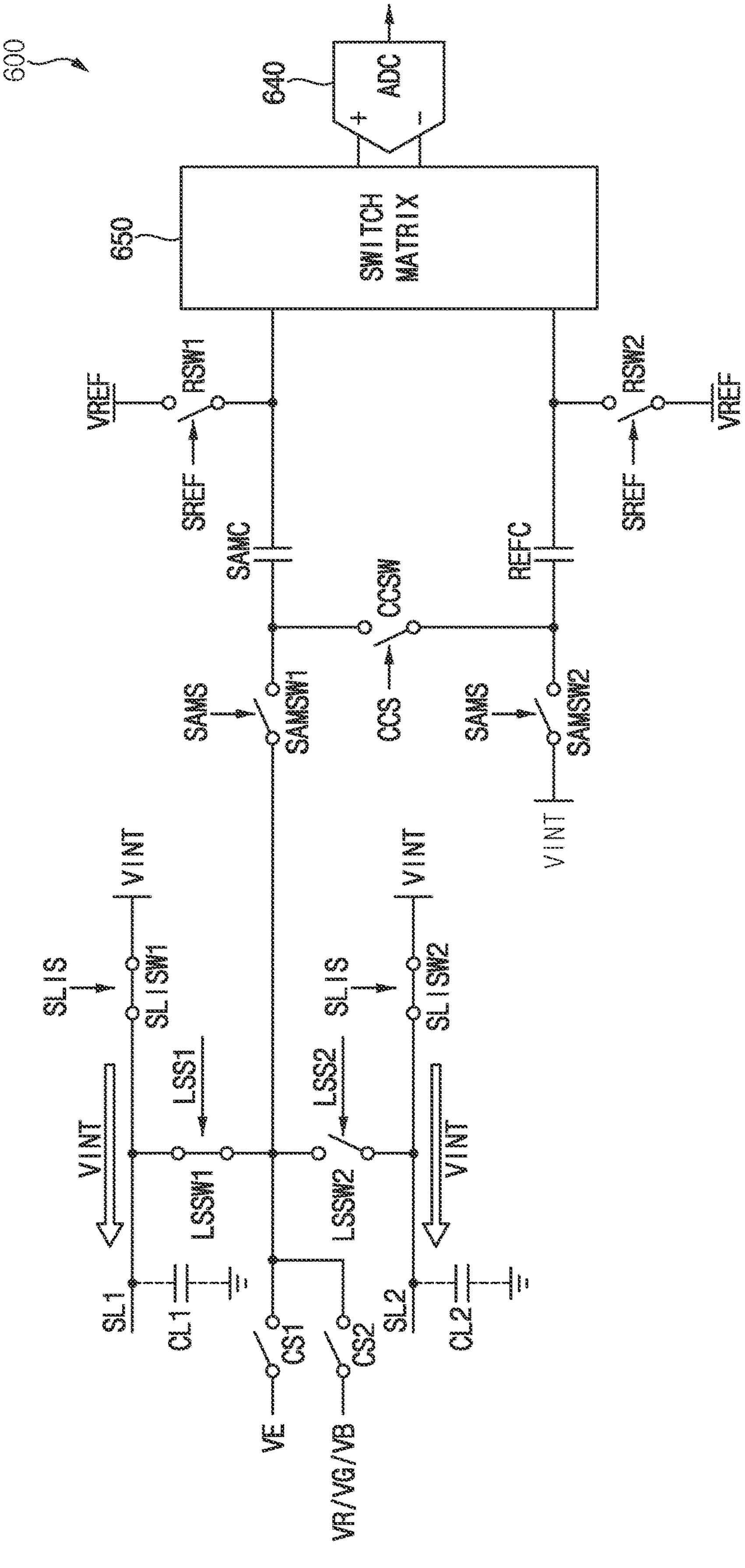
FIGS. 25 to 32 are schematic diagrams of a circuit showing an example in which the sensing circuit according to the method of compensating of FIG. 23 generates sensing data.

In a first sensing line initialization period, as shown in FIG. 25, the sensing line initialization circuit 610 may substantially simultaneously initialize the first sensing line SL1 and the second sensing line SL2. For example, in the first sensing line initialization period, the sensing line initialization signal SLIS may have an activation level, the first sensing line initialization switch SLISW1 may apply the initialization voltage VINT to the first sensing line SL1 in response to the sensing line initialization signal SLIS having the activation level, the second sensing line initialization switch SLISW2 may apply the initialization voltage VINT to the second sensing line SL2 in response to the sensing line initialization signal SLIS having the activation level, and the first sensing line SL1 and the second sensing line SL2 may be initialized based on the initialization voltage VINT.

Figure 26:
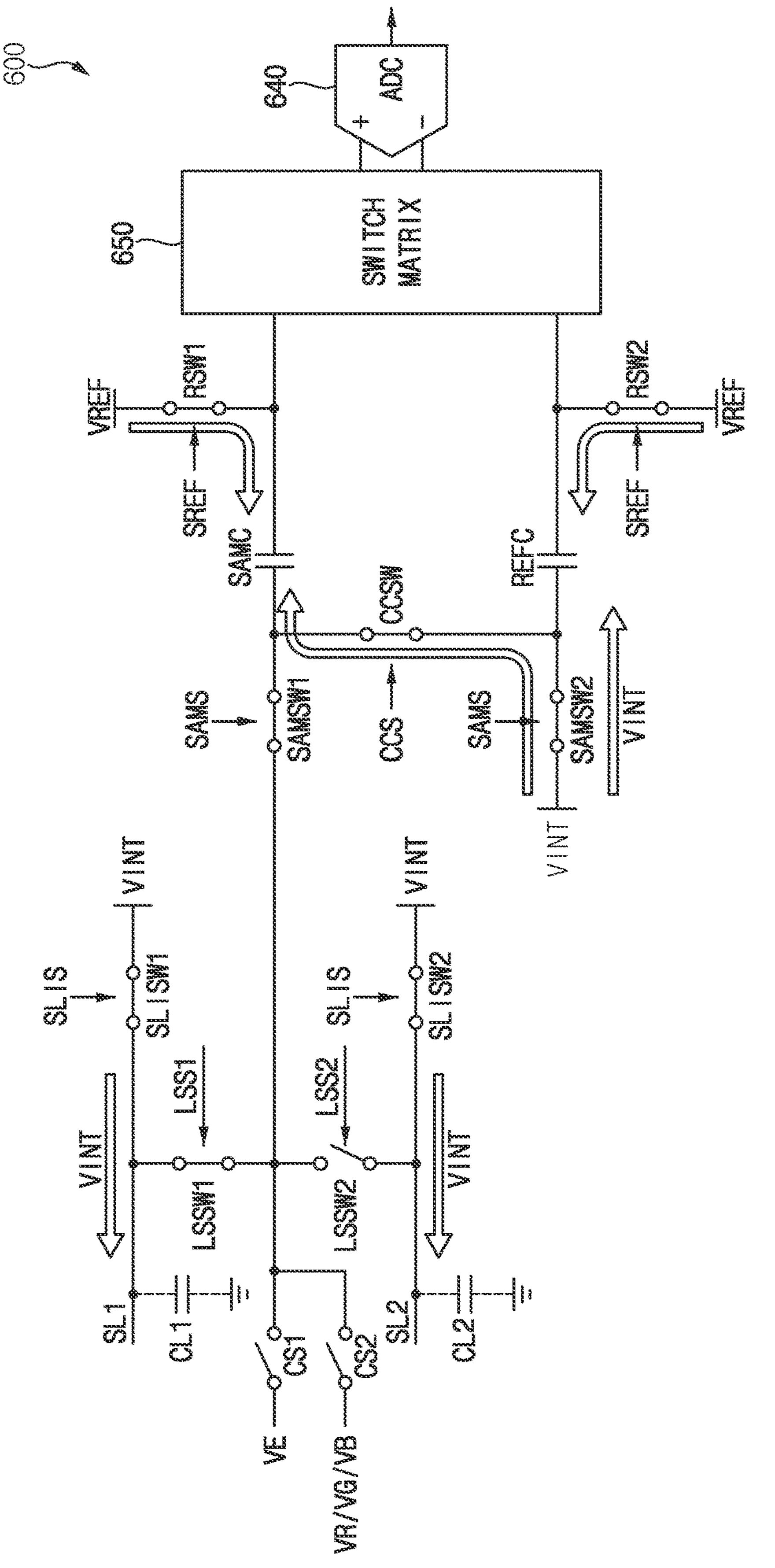

In a first capacitor initialization period, as shown in FIG. 26, the sampling capacitor SAMC and the reference capacitor REFC may be initialized. According to an embodiment, the first capacitor initialization period may overlap a portion of the first sensing line initialization period, for example, an end portion of the first sensing line initialization period. For example, in the first capacitor initialization period, the sampling signal SAMS, the reference signal SREF, and the channel connection signal CCS may have activation levels. The second sampling switch SAMSW2 may be turned on in response to the sampling signal SAMS having the activation level, and the channel connection switch CCSW may be turned on in response to the channel connection signal CCS having the activation level. Therefore, the initialization voltage VINT may be applied to the first electrode of the reference capacitor REFC through the second sampling switch SAMSW2, and may be applied to the first electrode of the sampling capacitor SAMC through the second sampling switch SAMSW2 and the channel connection switch CCSW. The first reference switch RSW1 and the second reference switch RSW2 may be turned on in response to the reference signal SREF having the activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2. Therefore, the sampling capacitor SAMC and the reference capacitor REFC may be initialized or discharged based on the initialization voltage VINT and the reference voltage VREF. According to an embodiment, the reference voltage VREF may have, but is not limited to, the same voltage level as the initialization voltage VINT. According to an embodiment, in the first capacitor initialization period, the sensing line initialization signal SLIS and a first line selection signal LSS1 may also have activation levels, the initialization voltage VINT may be further applied to the first electrode of the sampling capacitor SAMC through the first sensing line initialization switch SLISW1, the first line selection switch LSSW1, and the first sampling switch SAMSW1, and the initialization voltage VINT may be further applied to the first electrode of the reference capacitor REFC through the first sensing line initialization switch SLISW1, the first line selection switch LSSW1, the first sampling switch SAMSW1, and the channel connection switch CCSW.

Figure 27:
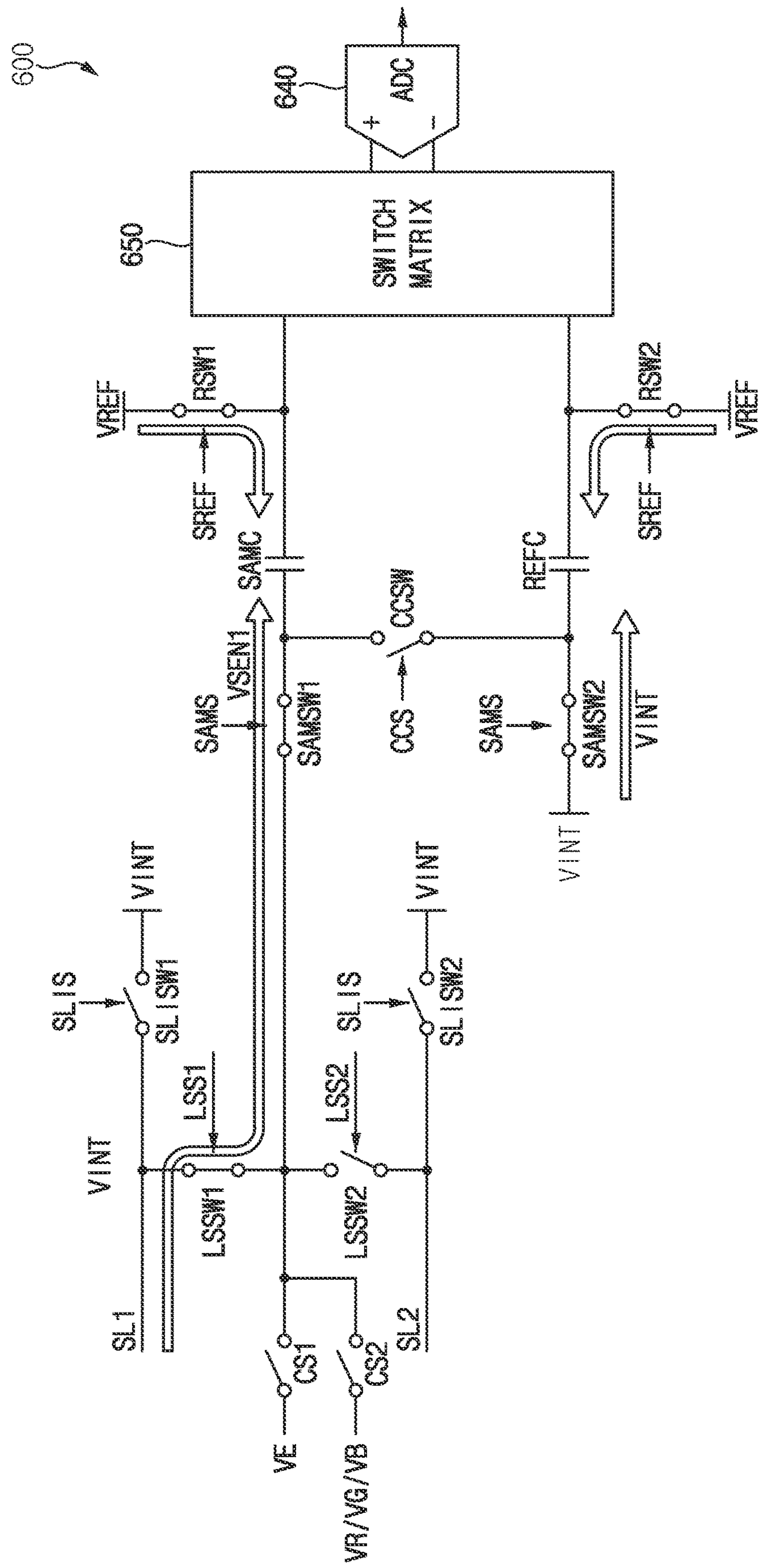

In a first sampling period, as shown in FIG. 27, a voltage of the first sensing line SL1 may be saturated with the first sensing voltage VSEN1, a voltage of the second sensing line SL2 may be saturated with the second sensing voltage VSEN2, and the sensing channel 620 may sample the first sensing voltage VSEN1 of the first sensing line SL1. For example, in the first sampling period, the first line selection signal LSS1, the sampling signal SAMS, and the reference signal SREF may have activation levels, and a second line selection signal LSS2 and the channel connection signal CCS may have inactivation levels. The first line selection switch LSSW1 may be turned on in response to the first line selection signal LSS1 having the activation level, and the first sampling switch SAMSW1 and the second sampling switch SAMSW2 may be turned on in response to the sampling signal SAMS having the activation level. Therefore, the first sensing voltage VSEN1 of the first sensing line SL1 may be applied to the first electrode of the sampling capacitor SAMC through the first line selection switch LSSW1 and the first sampling switch SAMSW1, and the initialization voltage VINT may be applied to the first electrode of the reference capacitor REFC through the second sampling switch SAMSW2. The first reference switch RSW1 and the second reference switch RSW2 may be turned on in response to the reference signal SREF having the activation level. Therefore, the reference voltage VREF may be applied to the second electrode of the sampling capacitor SAMC through the first reference switch RSW1, and may be applied to the second electrode of the reference capacitor REFC through the second reference switch RSW2.

Figure 28:
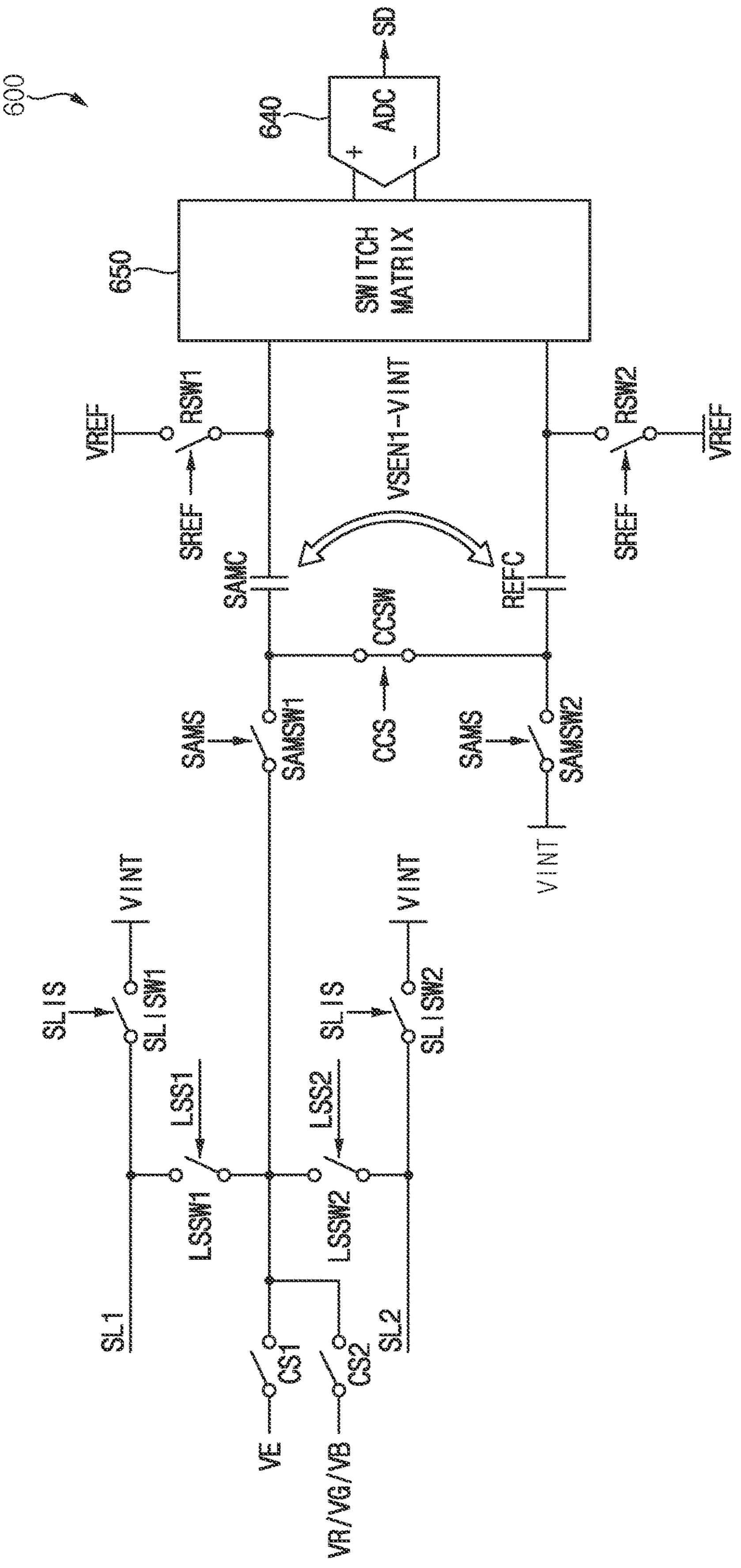

In a first analog-to-digital conversion period, as shown in FIG. 28, the switch matrix 650 and the analog-to-digital converter 640 may sequentially convert the first sensing voltages VSEN1 of the odd-numbered sensing lines (e.g., SL1) sampled by the sensing channels 620 into the sensing data SD. For example, the channel connection signal CCS may have an activation level. The channel connection switch CCSW may connect the first electrode of the sampling capacitor SAMC and the first electrode of the reference capacitor REFC to each other in response to the channel connection signal CCS having the activation level. Therefore, the first electrode of the sampling capacitor SAMC and the first electrode of the reference capacitor REFC may have the same voltage (e.g., a voltage between the first sensing voltage VSEN1 and the initialization voltage VINT), and the second electrode of the sampling capacitor SAMC and the second electrode of the reference capacitor REFC may have a first voltage difference VSEN1-VINT obtained by subtracting the initialization voltage VINT from the first sensing voltage VSEN1. The switch matrix 650 may connect the second electrode of the sampling capacitor SAMC and the second electrode of the reference capacitor REFC to a first input terminal and a second input terminal of the analog-to-digital converter 640, respectively, and the analog-to-digital converter 640 may convert the first voltage difference VSEN1-VINT into the sensing data SD.

Figure 29:
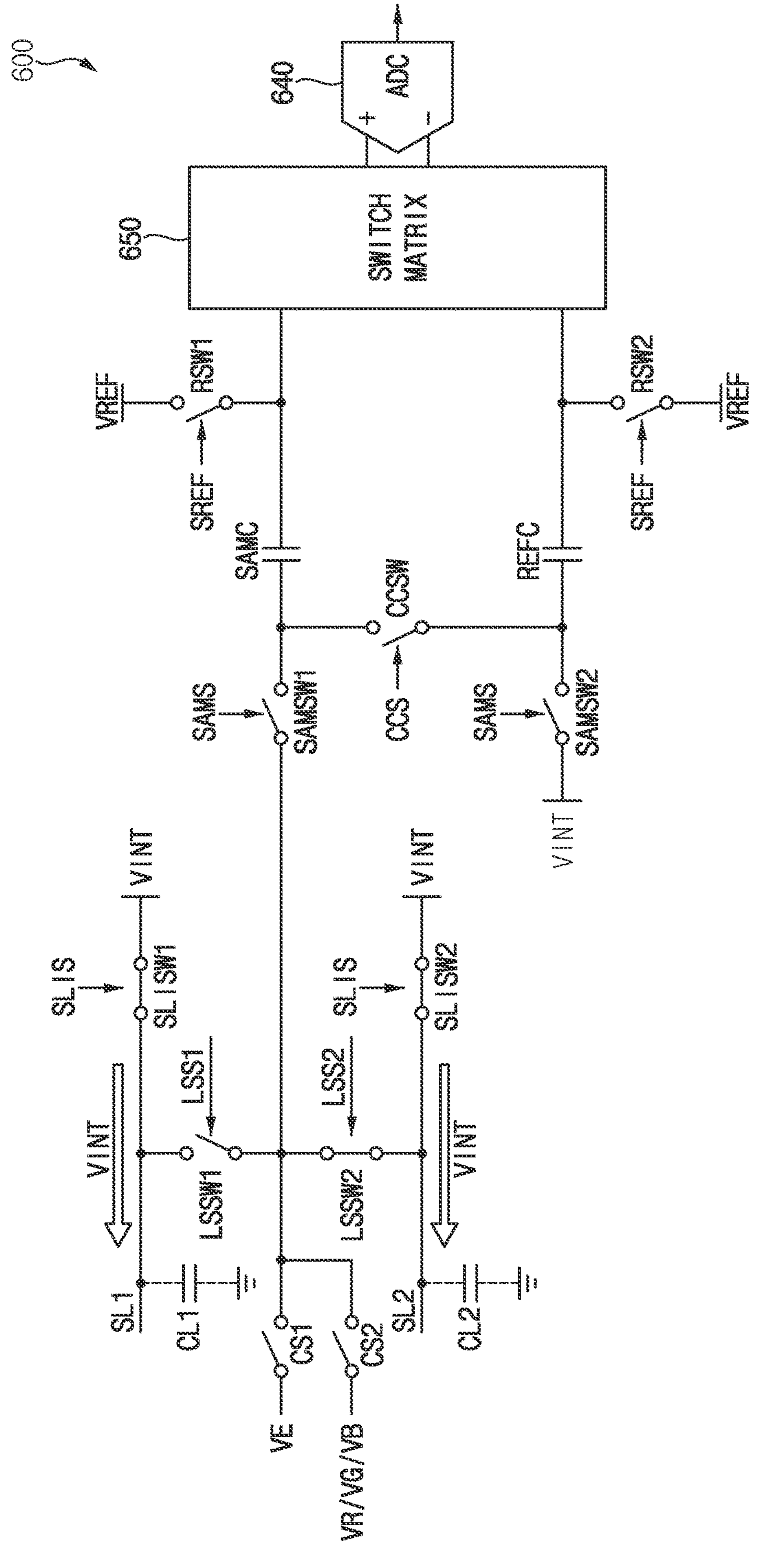
Figure 30:
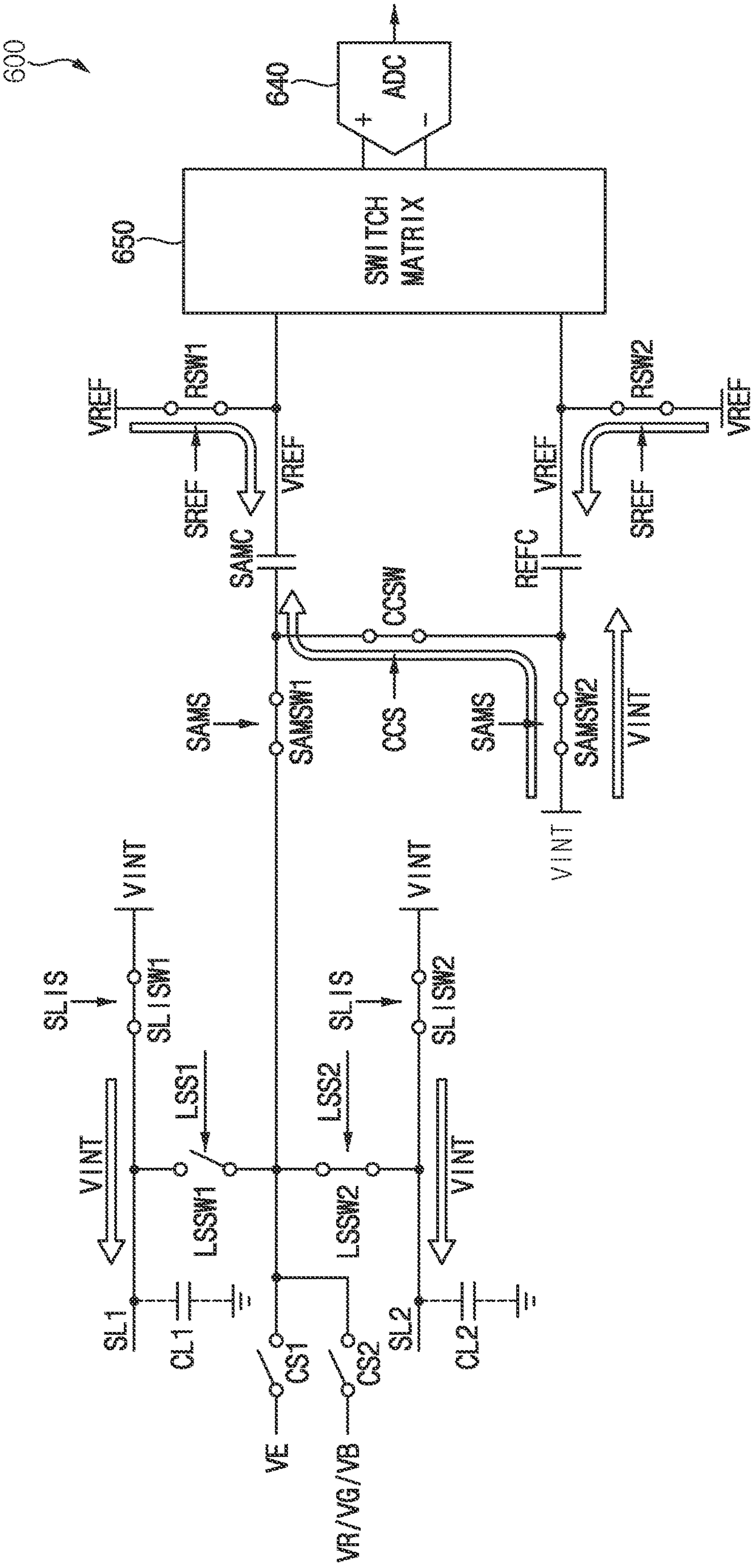

Thereafter, as shown in FIGS. 29 and 30, a second sensing line initialization period (i.e., FIG. 29) and a second capacitor initialization period (i.e., FIG. 30) may be included until a second sampling period. Since the second sensing line initialization period and the second capacitor initialization period may be substantially the same as the first sensing line initialization period and the first capacitor initialization period, respectively, except that the second line selection switch LSSW2 is turned on instead of the first line selection switch LSSW1, redundant descriptions will be omitted.

Figure 31:
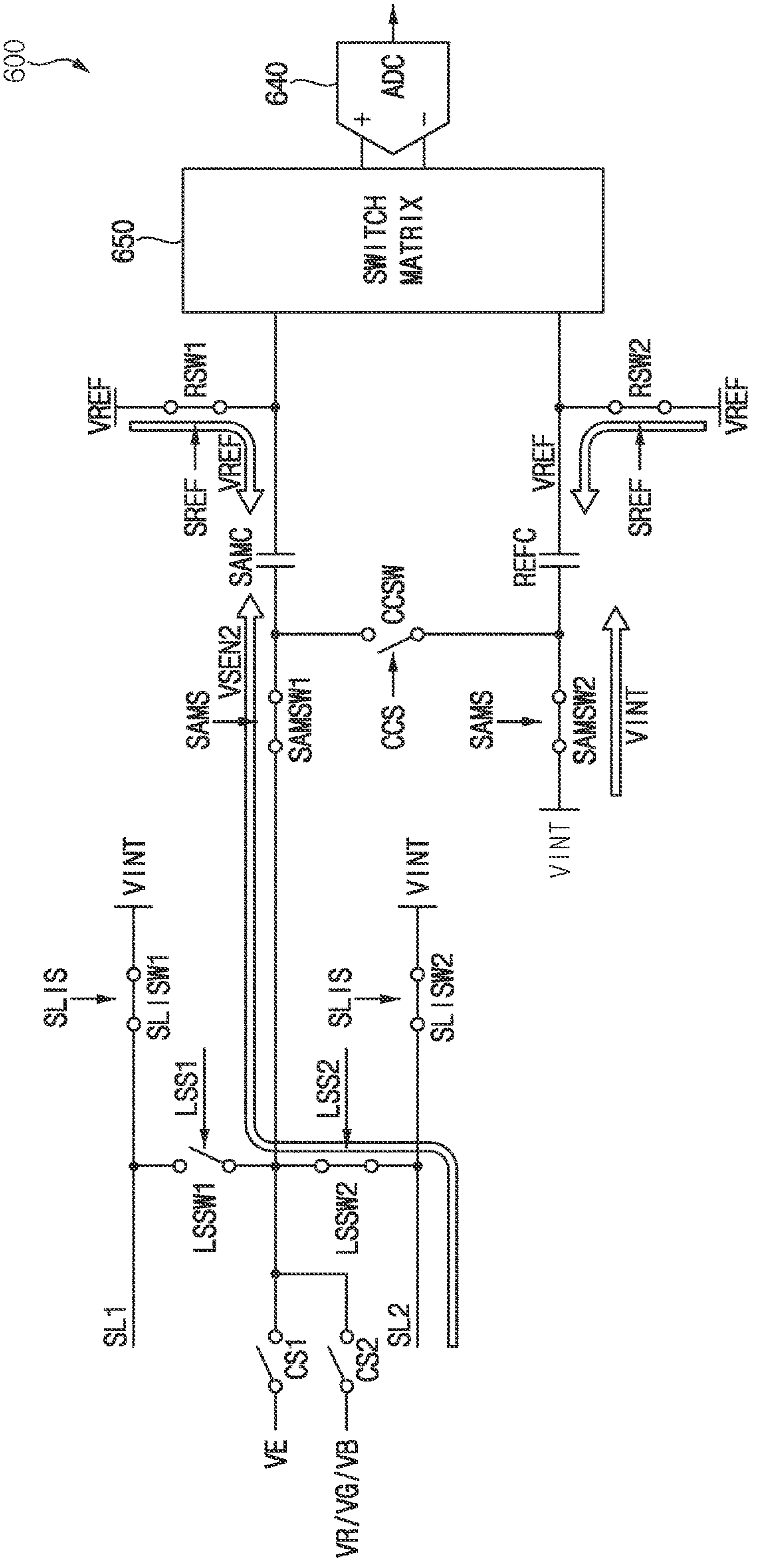
Figure 32:
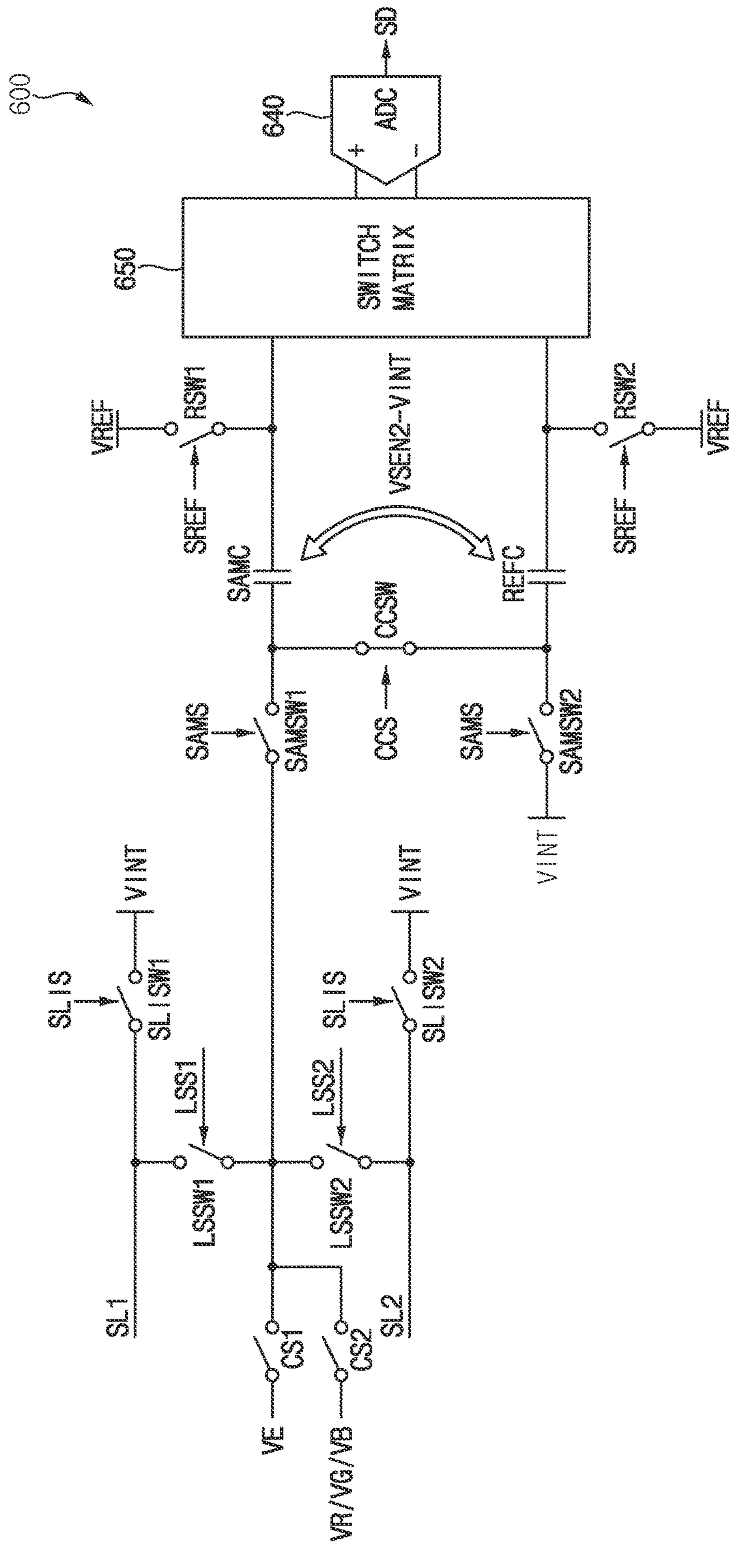

In the second sampling period, as shown in FIG. 31, the sensing channel 620 may sample the second sensing voltage VSEN2 of the second sensing line SL2. For example, in the second sampling period SAMP2, the second line selection signal LSS2, the sampling signal SAMS, and the reference signal SREF may have activation levels, and the first line selection signal LSS1 and the channel connection signal CCS may have inactivation levels. The second line selection switch LSSW2 may be turned on in response to the second line selection signal LSS2 having the activation level, and the first sampling switch SAMSW1 and the second sampling switch SAMSW2 may be turned on in response to the sampling signal SAMS having the activation level. Therefore, the second sensing voltage VSEN2 of the second sensing line SL2 may be applied to the first electrode of the sampling capacitor SAMC through the second line selection switch LSSW2 and the first sampling switch SAMSW1, and the initialization voltage VINT may be applied to the first electrode of the reference capacitor REFC through the second sampling switch SAMSW2. The first reference switch RSW1 and the second reference switch RSW2 may be turned on in response to the reference signal SREF having the activation level. Therefore, the reference voltage VREF may be applied to the second electrode of the sampling capacitor SAMC through the first reference switch RSW1, and may be applied to the second electrode of the reference capacitor REFC through the second reference switch RSW2.

In a second analog-to-digital conversion period, the switch matrix 650 and the analog-to-digital converter 640 may sequentially convert the second sensing voltages VSEN2 of the even-numbered sensing lines (e.g., SL2) sampled by the sensing channels 620 into the sensing data SD. For example, the channel connection signal CCS may have an activation level. The channel connection switch CCSW may connect the first electrode of the sampling capacitor SAMC and the first electrode of the reference capacitor REFC to each other in response to the channel connection signal CCS having the activation level. Therefore, the first electrode of the sampling capacitor SAMC and the first electrode of the reference capacitor REFC may have the same voltage (e.g., a voltage between the second sensing voltage VSEN2 and the initialization voltage VINT), and the second electrode of the sampling capacitor SAMC and the second electrode of the reference capacitor REFC may have a second voltage difference VSEN2-VINT obtained by subtracting the initialization voltage VINT from the second sensing voltage VSEN2. The switch matrix 650 may connect the second electrode of the sampling capacitor SAMC and the second electrode of the reference capacitor REFC to the first input terminal and the second input terminal of the analog-to-digital converter 640, respectively, and the analog-to-digital converter 640 may convert the second voltage difference VSEN2-VINT into the sensing data SD.

Figure 33:
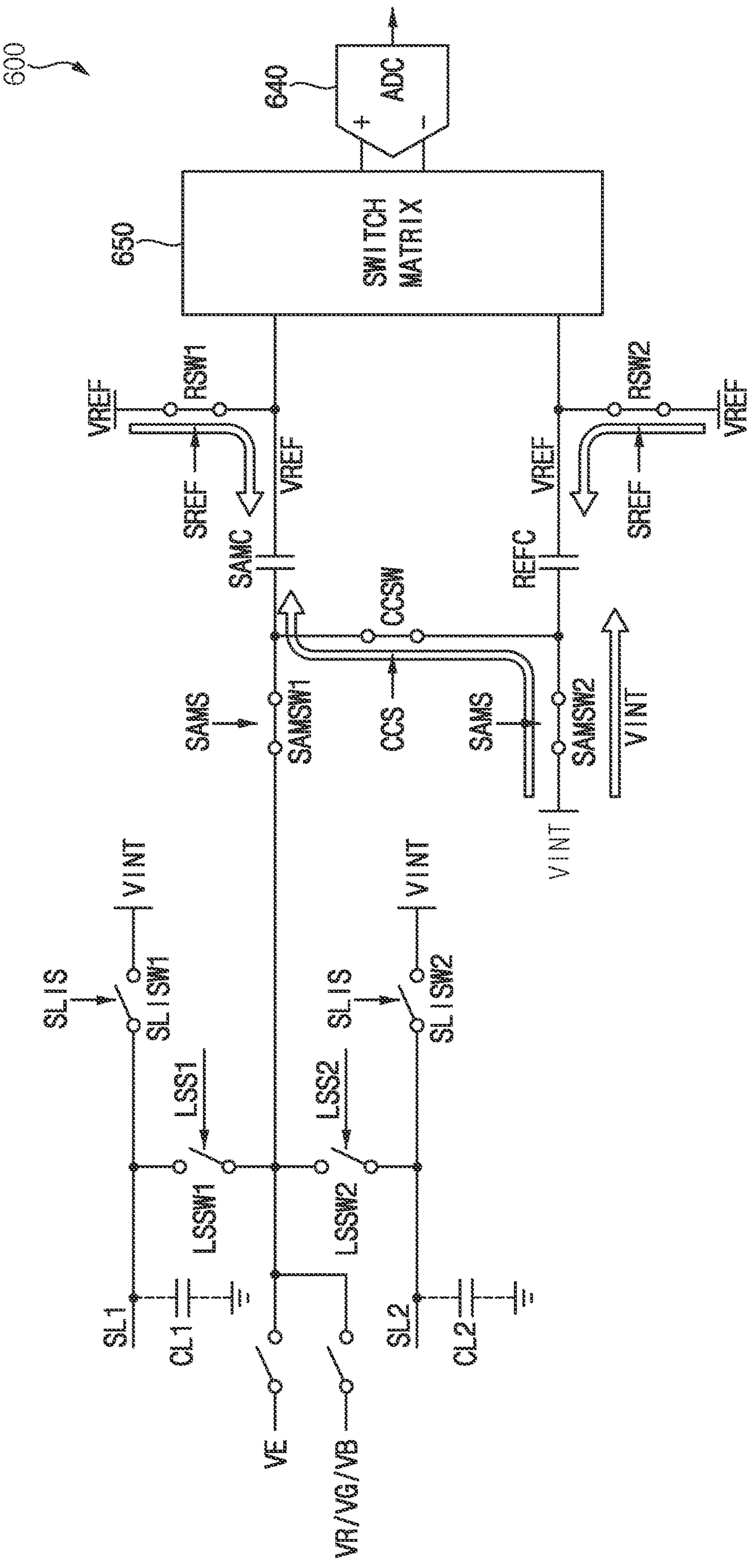
FIGS. 33 to 35 are schematic views showing an example in which the sensing circuit according to the method of compensating of FIG. 23 generates a first output value.
Figure 34:
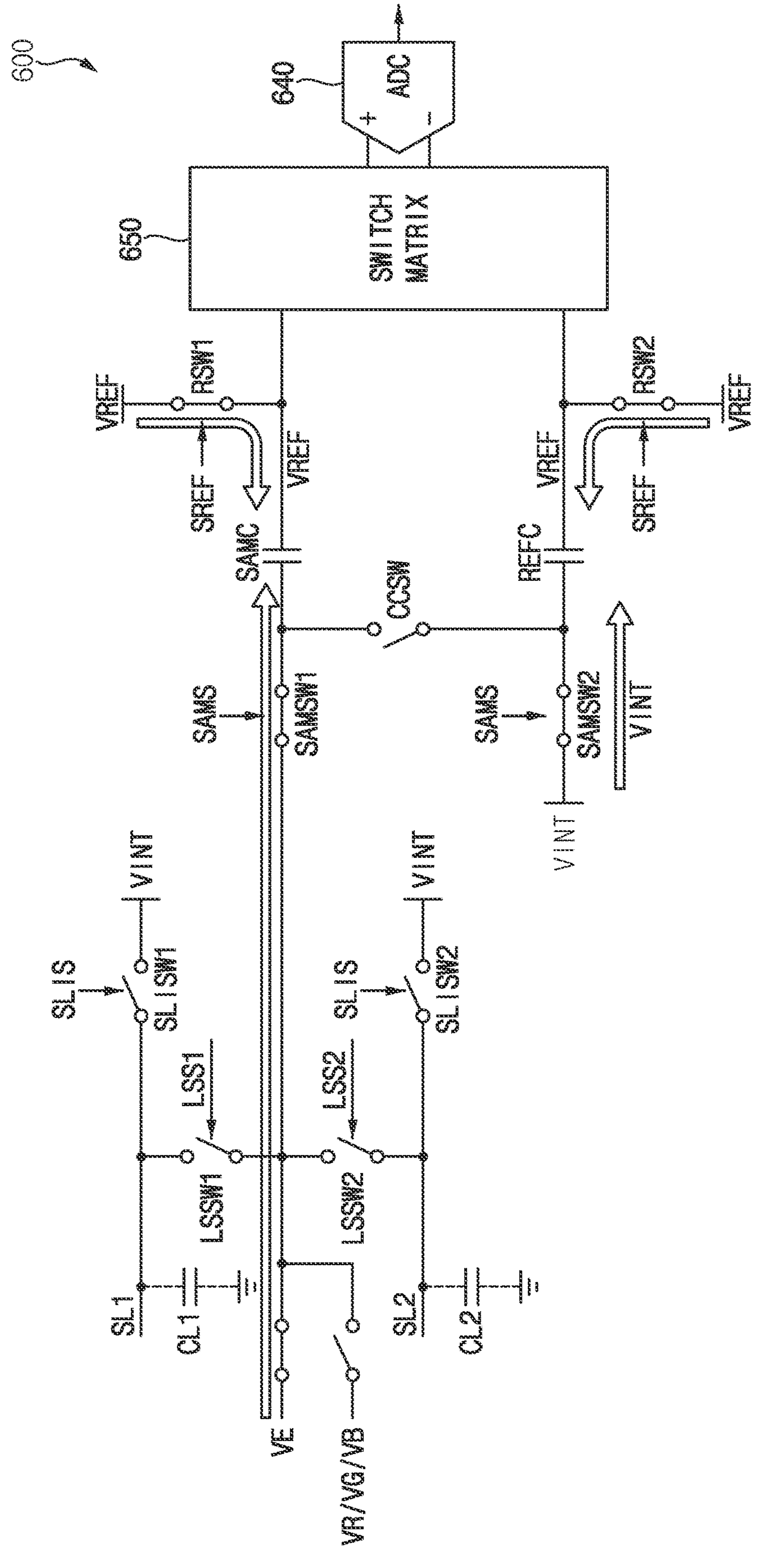
Figure 35:
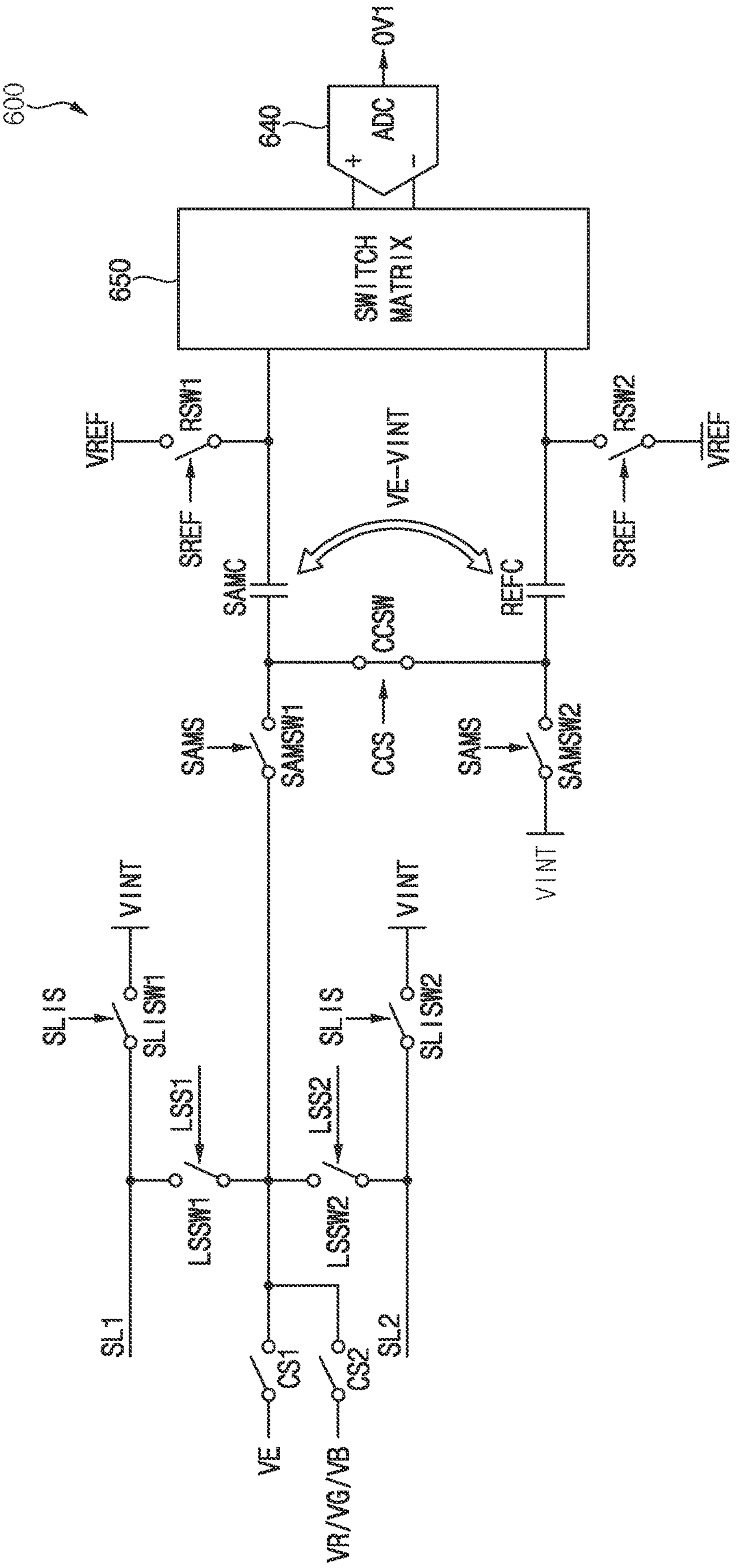

FIGS. 33 to 35 are schematic views showing an example in which the sensing circuit 600 according to the method of compensating of FIG. 23 generates a first output value OV1.

Referring to FIGS. 2, 23, and 33 to 35, the method of compensating of FIG. 23 may include measuring a first output value OV1 of a sensing circuit 600 that senses pixels P by applying an external voltage VE to the sensing circuit 600 (S100). The external voltage VE may be applied from an outside of the display device as a preset voltage.

The sensing circuit 600 may include a first compensation switch CS1 that is turned on to apply the external voltage VE to the sensing channel 620.

Since an operation of FIGS. 33 to 35 has been described with reference to FIGS. 11 to 13, redundant descriptions will be omitted.

Figure 36:
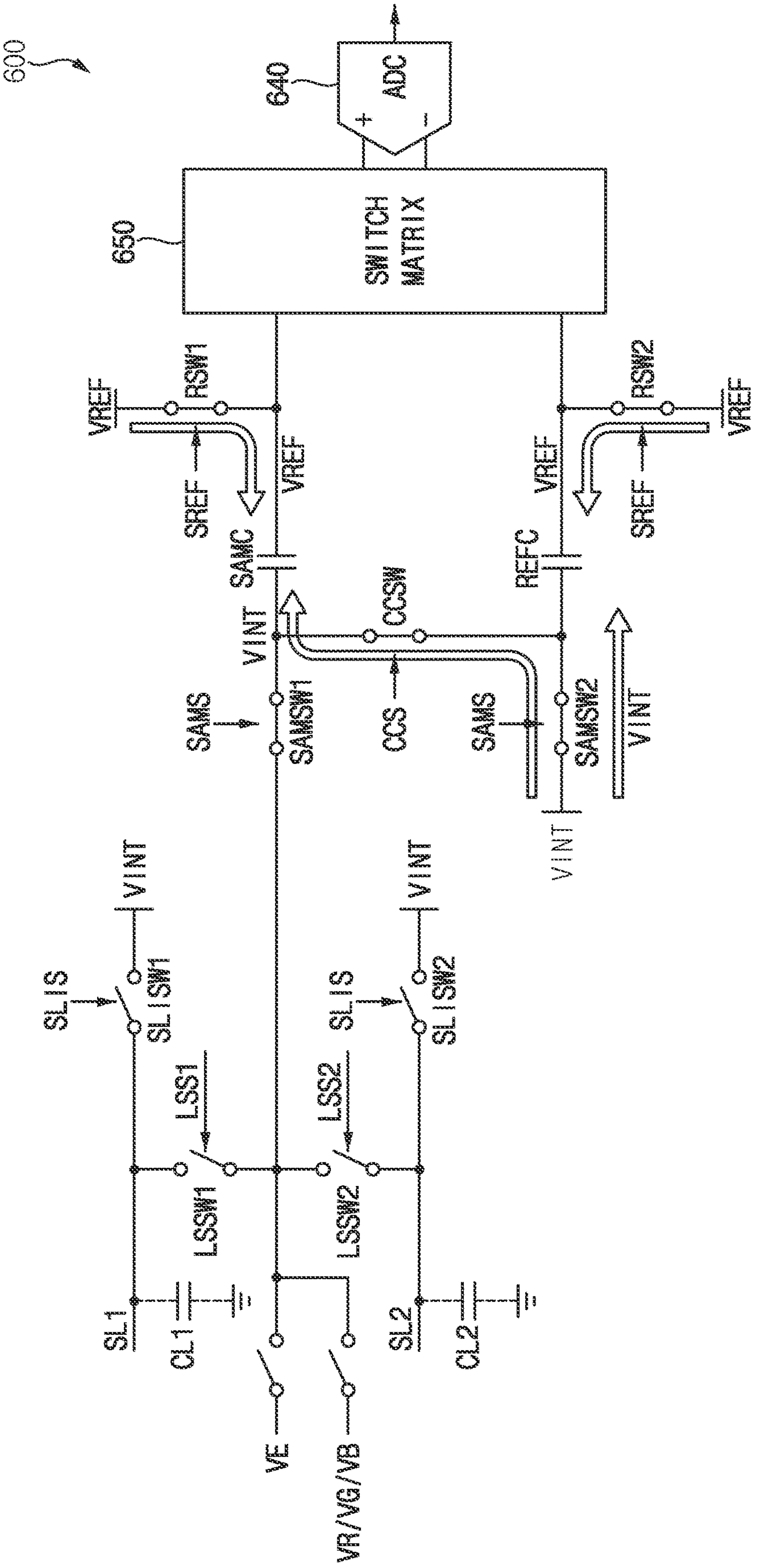
FIGS. 36 to 38 are schematic views showing an example in which the sensing circuit according to the method of compensating of FIG. 23 generates second output values.
Figure 37:
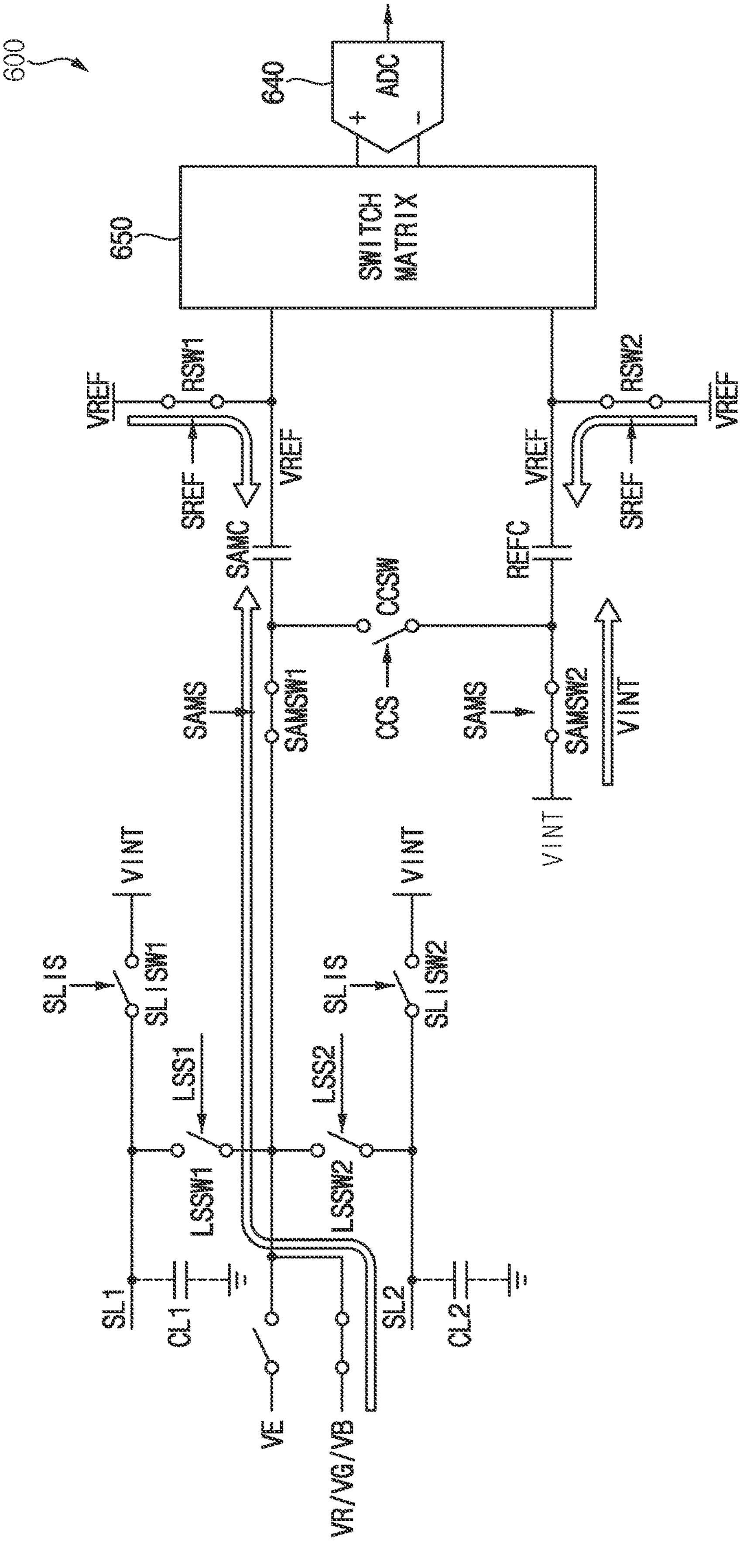
Figure 38:
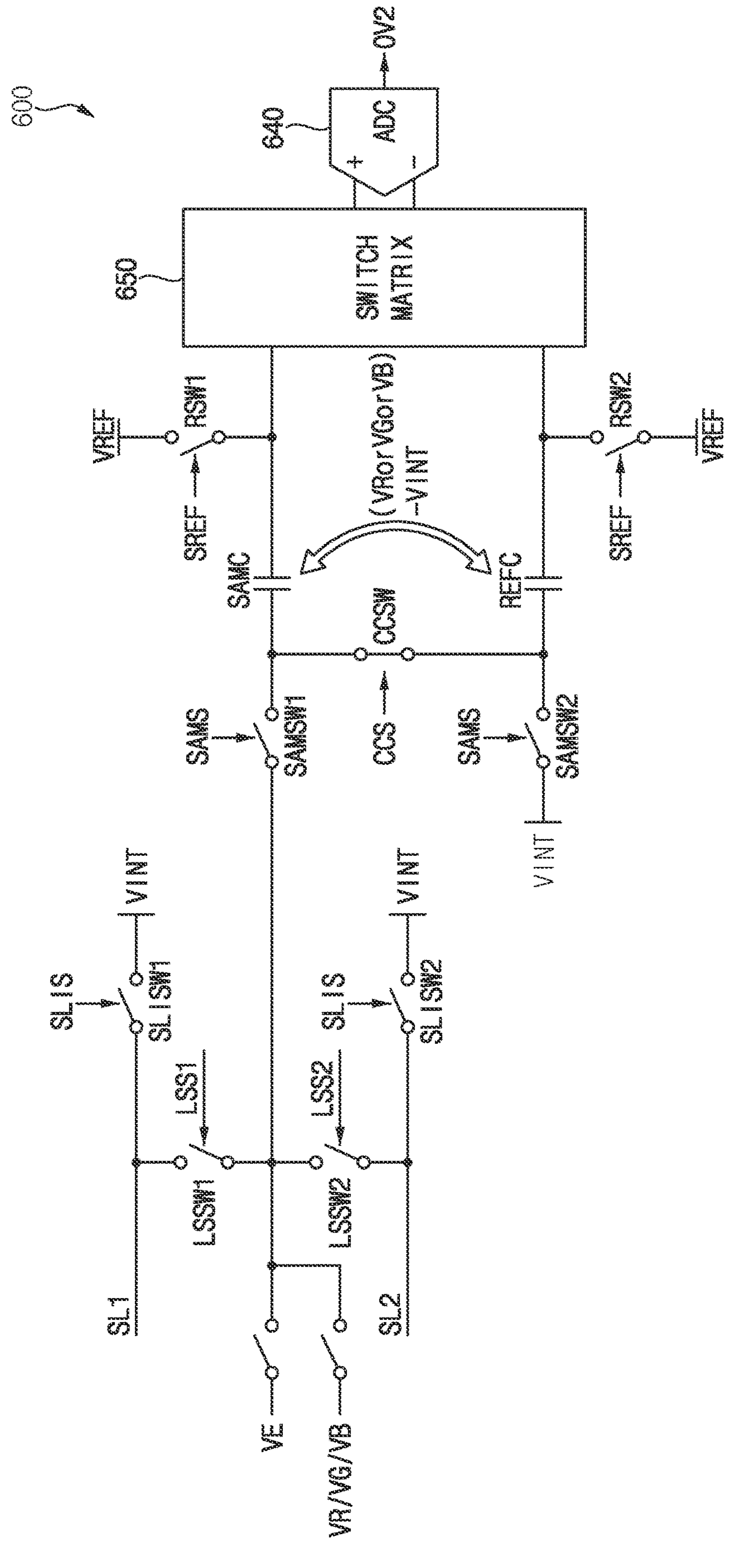

FIGS. 36 to 38 are schematic views showing an example in which the sensing circuit 600 according to the method of compensating of FIG. 23 generates second output values OV2.

Referring to FIGS. 2, 4, 23, and 36 to 38, the method of compensating of FIG. 23 may include measuring second output values OV2 of the sensing circuit 600 by applying output voltages within an output range of the data driver 400 to the sensing circuit 600 through a first portion of the output amplifiers 420 of the data driver 400 (S210), and measuring the second output values OV2 of the sensing circuit 600 by applying the output voltages to the sensing circuit 600 through a second portion of the output amplifiers 420 (S220). The second output values OV2 may be measured by applying the output voltages (i.e., the gray level voltages VR, VG, and VB) to the sensing channel 620.

For example, the first portion may be odd-numbered output amplifiers 420 among the output amplifiers 420. The second portion may be even-numbered output amplifiers 420 among the output amplifiers 420.

The sensing circuit 600 may include a second compensation switch CS2 that is turned on to apply the gray level voltages VR, VG, and VB to the sensing channel 620.

FIGS. 25 to 32 may be a sensing operation performed in case that the display device is actually driven. FIGS. 33 to 38 may be an operation for generating the compensation look-up table (430 in FIG. 4) in a stage before assembly of the display device.

For example, according to the method of compensating of FIG. 23, the second output values OV2 may be measured twice by using all of the sensing channels 620 that will be used in the display device. In this case, the first output value OV1 may be measured separately in each of the sensing channels 620. However, the disclosure is not limited thereto. For example, the first output value OV1 measured by one of the sensing channels 620 may be used.

Since one sensing channel 620 is connected to two sensing lines SL1 and SL2, the second output values OV2 of the sensing circuit 600 may be measured by applying the output voltages to the sensing circuit 600 through the odd-numbered output amplifiers 420, and the second output values OV2 of the sensing circuit 600 may be measured by applying the output voltages to the sensing circuit 600 through the even-numbered output amplifiers 420.

Since an operation of FIGS. 36 to 38 has been described with reference to FIGS. 14 to 16, redundant descriptions will be omitted.

Figure 39:
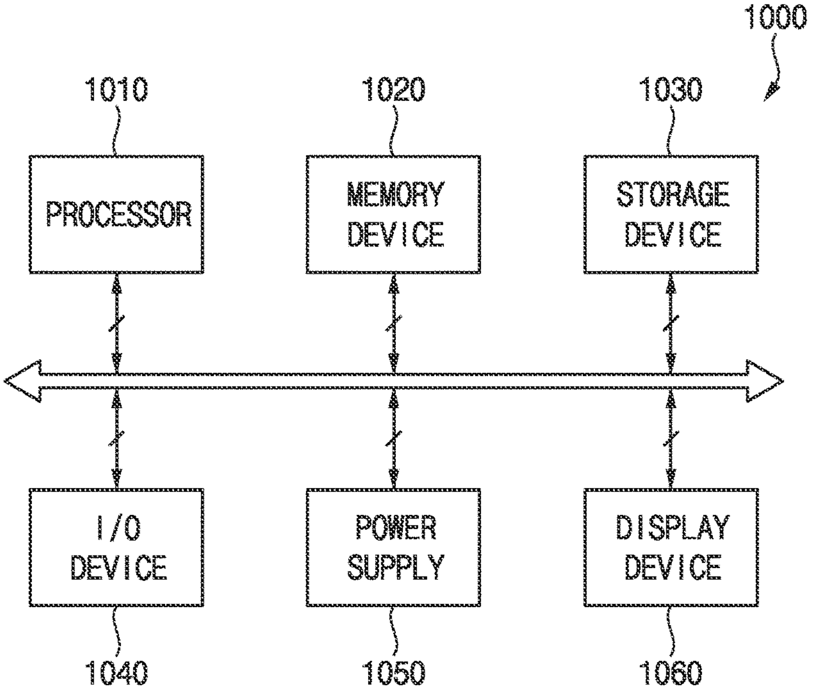
FIG. 39 is a schematic block diagram showing an electronic device according to embodiments of the disclosure.
Figure 40:
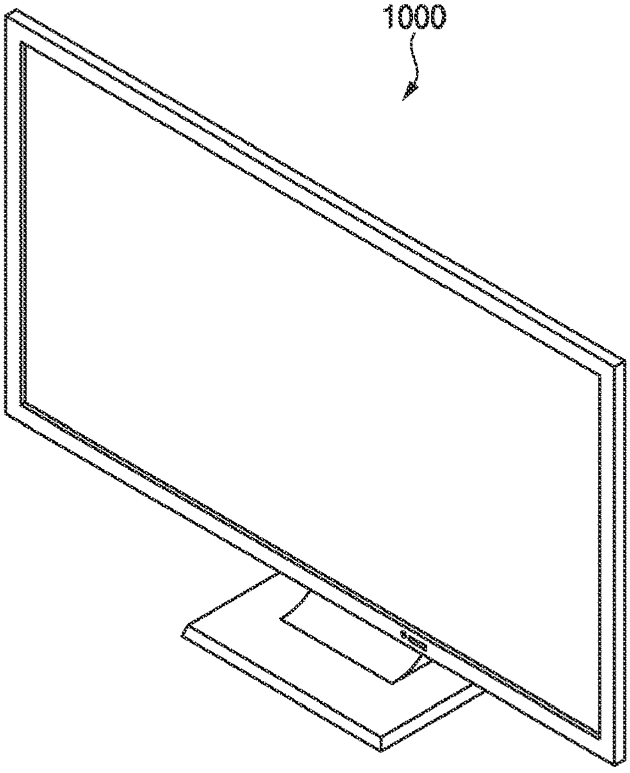
FIG. 40 is a schematic diagram showing an example in which the electronic device of FIG. 39 is implemented as a television.

FIG. 39 is a schematic block diagram showing an electronic device according to embodiments of the disclosure, and FIG. 40 is a schematic diagram showing an example in which the electronic device of FIG. 39 is implemented as a television.

Referring to FIGS. 39 and 40, the electronic device 1000 may include a processor 1010, a memory device 1020, a storage device 1030, an input/output (I/O) device 1040, a power supply 1050, and a display device 1060. Here, the display device 1060 may be the display device of FIG. 1. The electronic device 1000 may further include ports for communicating with a video card, a sound card, a memory card, a universal serial bus (USB) device, other electronic devices, etc. In an embodiment, as shown in FIG. 40, the electronic device 1000 may be implemented as a television. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be electrically connected to other components via an address bus, a control bus, a data bus, etc. Further, the processor 1010 may be electrically connected to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum-dot light emitting display device. However, the display device 1060 is not limited thereto. The display device 1060 may be electrically connected to other components via the buses or other communication links. The display device 1060 may compensate for output deviations of the data driver. Accordingly, the display device 1060 may prevent a vertical line from being visually recognized on a display panel.

The disclosure may be applied to a display device and an electronic device including the display device. For example, the disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included within the scope of the disclosure. Therefore, it is to be understood that the foregoing is illustrative of various embodiments and is not to be construed as limited to the specific embodiments disclosed, and that modifications to the disclosed embodiments, as well as other embodiments, are intended to be included within the scope of the disclosure.

What is claimed is:

1. A method of compensating for an output of a data driver of a display device, the method comprising:

measuring a first output value of a sensing circuit that senses pixels by applying an external voltage to the sensing circuit;

measuring second output values of the sensing circuit by applying output voltages within an output range of the data driver to the sensing circuit through output amplifiers of the data driver;

generating a compensation look-up table based on the first output value and the second output values; and compensating for the output voltages of the data driver based on the compensation look-up table.

2. The method of claim 1, wherein the compensation look-up table is generated based on differences between the first output value and the second output values.

3. The method of claim 1, wherein the data driver outputs gray level voltages as the output voltages.

4. The method of claim 3, wherein the measuring of the second output values includes:

measuring the second output values for a first color by applying the gray level voltages for the first color to the sensing circuit through the output amplifiers for the first color;

measuring the second output values for a second color by applying the gray level voltages for the second color to the sensing circuit through the output amplifiers for the second color; and measuring the second output values for a third color by applying the gray level voltages for the third color to the sensing circuit through the output amplifiers for the third color.

5. The method of claim 4, wherein a number of the output amplifiers for the first color is equal to a horizontal resolution of a display panel, a number of the output amplifiers for the second color is equal to the horizontal resolution of the display panel, a number of the output amplifiers for the third color is equal to the horizontal resolution of the display panel, a number of the second output values for the first color is equal to a number of gray levels multiplied by the horizontal resolution, a number of the second output values for the second color is equal to the number of gray levels multiplied by the horizontal resolution, and a number of the second output values for the third color is equal to the number of the gray levels multiplied by the horizontal resolution.

6. The method of claim 5, wherein the compensation look-up table includes compensation values, a number of the compensation values for the first color is equal to the number of the gray levels multiplied by the horizontal resolution multiplied by a vertical resolution of the display panel, a number of the compensation values for the second color is equal to the number of the gray levels multiplied by the horizontal resolution multiplied by the vertical resolution of the display panel, and a number of the compensation values for the third color is equal to the number of the gray levels multiplied by the horizontal resolution multiplied by the vertical resolution of the display panel.

7. The method of claim 1, wherein the measuring of the second output values includes:

repeatedly applying the output voltages, which are equal to each other, to the sensing circuit through the output amplifiers; and calculating average values of the second output values for the output voltages, which are equal to each other, and the compensation look-up table is generated based on the average values.

8. A method of compensating for an output of a data driver of a display device, the method comprising:

measuring a first output value of a sensing circuit that senses pixels by applying an external voltage to the sensing circuit;

measuring second output values of the sensing circuit by applying output voltages within an output range of the data driver to the sensing circuit through output amplifiers of the data driver;

generating a compensation look-up table based on the first output value and the second output values; and compensating for the output voltages of the data driver based on the compensation look-up table, wherein the compensation look-up table includes compensation values for compensating for deviations of the output amplifiers for differences between the first output value and the second output values.

9. The method of claim 8, wherein the output voltages are compensated for by adding the compensation values to the output voltages.

10. The method of claim 1, wherein the data driver outputs gray level voltages as the output voltages, the compensation look-up table includes compensation values, and the compensation values for the gray level voltages corresponding to a reference gray level or less are about 0.

11. The method of claim 1, wherein the data driver outputs gray level voltages as the output voltages, the compensation look-up table includes compensation values, and the compensation values for the gray level voltages corresponding to a reference gray level or more are about 0.

12. The method of claim 1, wherein the data driver includes a DC-DC converter that determines the output voltages of the data driver based on a voltage control signal.

13. The method of claim 1, wherein the sensing circuit includes:

a sensing line initialization circuit that initializes a sensing line;

a line selection switch that electrically connects the sensing line to a sensing channel; and the sensing channel that samples a sensing voltage of the sensing line.

14. The method of claim 13, wherein the second output values are measured by applying the output voltages to the sensing channel.

15. The method of claim 14, wherein the sensing circuit further includes:

an analog-to-digital converter; and a switch matrix that electrically connects the sensing channel to the analog-to-digital converter.

16. A method of compensating for an output of a data driver of a display device, the method comprising:

measuring a first output value of a sensing circuit that senses pixels by applying an external voltage to the sensing circuit;

measuring second output values of the sensing circuit by applying output voltages within an output range of the data driver to the sensing circuit through a first portion of output amplifiers of the data driver;

measuring the second output values of the sensing circuit by applying the output voltages to the sensing circuit through a second portion of the output amplifiers;

generating a compensation look-up table based on the first output value and the second output values; and compensating for the output voltages of the data driver based on the compensation look-up table.

17. The method of claim 16, wherein the compensation look-up table is generated based on differences between the first output value and the second output values.

18. The method of claim 16, wherein the sensing circuit includes:

a sensing line initialization circuit that simultaneously initializes a first sensing line and a second sensing line;

a first line selection switch that electrically connects the first sensing line to a sensing channel;

a second line selection switch that electrically connects the second sensing line to the sensing channel; and the sensing channel that samples a first sensing voltage of the first sensing line and samples a second sensing voltage of the second sensing line.

19. The method of claim 18, wherein the second output values are measured by applying the output voltages to the sensing channel.

20. The method of claim 19, wherein the sensing circuit further includes:

an analog-to-digital converter; and a switch matrix that electrically connects the sensing channel to the analog-to-digital converter.

* * * * *